(12) United States Patent
Thomas et al.

(10) Patent No.: US 11,343,720 B2
(45) Date of Patent: May 24, 2022

(54) PREEMPTIVE HANDOVER PREPARATION AND TRACKING/PAGING AREA HANDLING AND INTELLIGENT ROUTE SELECTION IN A CELLULAR NETWORK

(71) Applicant: Fraunhofer-Gesellschaft zur Foerderung der angewandten Forschung e.V., Munich (DE)

(72) Inventors: Robin Rajan Thomas, Berlin (DE); Thomas Wirth, Kleinmachnow (DE); Cornelius Hellge, Berlin (DE); Thomas Fehrenbach, Berlin (DE); Thomas Schierl, Berlin (DE); Eiko Seidel, Munich (DE); Lars Thiele, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/431,647

(22) Filed: Jun. 4, 2019

(65) Prior Publication Data
US 2019/0289505 A1 Sep. 19, 2019

Related U.S. Application Data

(63) Continuation of application No. PCT/EP2018/000109, filed on Mar. 22, 2018.

(30) Foreign Application Priority Data

Mar. 23, 2017 (EP) .................................... 17162641

(51) Int. Cl.
*H04W 36/00* (2009.01)
*H04W 36/08* (2009.01)
(Continued)

(52) U.S. Cl.
CPC . *H04W 36/0016* (2013.01); *H04W 36/00835* (2018.08); *H04W 36/08* (2013.01);
(Continued)

(58) Field of Classification Search
CPC ....... H04W 36/0016; H04W 36/00835; H04W 36/08; H04W 36/245; H04W 36/32; H04W 68/02; H04W 68/04
See application file for complete search history.

(56) References Cited

U.S. PATENT DOCUMENTS 7,251,491 B2 7/2007 Jha
9,485,771 B2 11/2016 Kilpatrick et al.
(Continued)

FOREIGN PATENT DOCUMENTS

CN 102625378 A 8/2012
CN 103501232 A 1/2014
(Continued)

OTHER PUBLICATIONS

"1.3GPP, Study on New Radio Access Technology; Radio Access Architecture and Interfaces (Release 14)", Tech. Rep, TR 36.801 v1.0.0, Dec. 2016.
(Continued)

*Primary Examiner* — Hassan Kizou
*Assistant Examiner* — Abdullahi Ahmed
(74) *Attorney, Agent, or Firm* — Perkins Coie LLP; Michael A. Glenn

(57) ABSTRACT

A concept for handovers in cellular networks, a concept for improved handling of tracking/paging areas for, for instance, user entities in inactive modes and a concept for enabling intelligent route selection in cellular networks are presented.

34 Claims, 20 Drawing Sheets

(51) Int. Cl.
H04W 36/24 (2009.01)
H04W 36/32 (2009.01)
H04W 68/02 (2009.01)
H04W 68/04 (2009.01)

(52) U.S. Cl.
CPC ......... H04W 36/245 (2013.01); H04W 36/32 (2013.01); H04W 68/02 (2013.01); H04W 68/04 (2013.01)

(56) References Cited

U.S. PATENT DOCUMENTS

| | | | |
|---|---|---|---|
| 2009/0042572 A1* | 2/2009 | Craig | H04W 36/28 455/436 |
| 2010/0246530 A1* | 9/2010 | Pehrsson | H04W 36/0022 370/331 |
| 2010/0330994 A1* | 12/2010 | Matsuo | H04W 36/38 455/436 |
| 2011/0310840 A1 | 12/2011 | Kennedy et al. | |
| 2011/0310866 A1 | 12/2011 | Kennedy et al. | |
| 2012/0190363 A1* | 7/2012 | Maeda | H04W 36/0072 455/435.1 |
| 2012/0243461 A1* | 9/2012 | Bucknell | H04W 36/02 370/315 |
| 2013/0115954 A1 | 5/2013 | Charbit et al. | |
| 2013/0208696 A1 | 8/2013 | Garcia et al. | |
| 2014/0242997 A1 | 8/2014 | Golan et al. | |
| 2014/0355566 A1 | 12/2014 | Walley et al. | |
| 2015/0065146 A1 | 3/2015 | Wenger | |
| 2015/0156686 A1 | 6/2015 | Kikuchi | |
| 2015/0373602 A1 | 12/2015 | Hampel et al. | |
| 2017/0086049 A1* | 3/2017 | Vrzic | H04L 45/306 |
| 2017/0245192 A1* | 8/2017 | Sadri | H04W 36/0009 |
| 2017/0289864 A1* | 10/2017 | Narasimha | H04W 36/0009 |
| 2018/0234919 A1* | 8/2018 | Tsuda | H04W 52/0216 |
| 2019/0044611 A1* | 2/2019 | Treesh | H04W 36/24 |
| 2019/0052327 A1* | 2/2019 | Motozuka | H04B 7/0491 |
| 2020/0344652 A1* | 10/2020 | Park | H04W 36/0007 |

FOREIGN PATENT DOCUMENTS

| | | |
|---|---|---|
| CN | 104902529 A | 9/2015 |
| CN | 105144790 A | 12/2015 |
| EP | 2615857 A1 | 7/2013 |
| JP | 2006505163 A | 2/2006 |
| JP | 2013172407 A | 9/2013 |
| RU | 2387100 C2 | 4/2010 |
| WO | 2004040933 A1 | 5/2004 |
| WO | 2014013846 A1 | 1/2014 |

OTHER PUBLICATIONS

"Alcatel Lucent, The LTE Network Architecture", A comprehensive Tutorial, White Paper, 2009, pp. 1-26.

"Broadcom Corporation, "Mobility for dual connectivity"", T-DOC, R2-130990, 2013.

"Developing Solutions, About the S1 Dictionary", http://www.developingsolutions.com/S1Dict/Topics/About.htm.

"Intelligent Transport Systems (ITS)", Vehicular Communications; Basic Set of Applications; Part 2: Specification of Cooperative Awareness Basic Service, ETSI TS 102 637-2 V1.2.1, Mar. 2011.

"Intelligent Transport Systems (ITS)", Vehicular Communications; Basic Set of Applications; Part 3: Specifications of Decentralized Environmental Notification Basic Service, Final draft ETSI EN 302 637-3 V1.2.1, Sep. 2014.

"LTE; Evolved Universal Terrestrial Radio Access Network (E-UTRAN)", S1 Application Protocol (S1AP), TS 136 413 V12.3.0, Sep. 2014, pp. 114.

"LTE; Evolved Universal Terrestrial Radio Access Network (E-UTRAN)", Overall Description, Stage 2, Release 14, TS 36 300 V14.1.0, Dec. 2016, pp. 96.

"Part 1 of 3—Intelligent Transport Systems (ITS)", Framework for Public Mobile Networks in Cooperative ITS (C-ITS); ETSI TR 102 962 V1.1.1, Feb. 2012, pp. 37.

"Part 2 of 3—Intelligent Transport Systems (ITS)", Framework for Public Mobile Networks in Cooperative ITS (C-ITS); ETSI TR 102 962 V1.1.1, Feb. 2012, pp. 37.

"Part 3 of 3—Intelligent Transport Systems (ITS)", Framework for Public Mobile Networks in Cooperative ITS (C-ITS); ETSI TR 102 962 V1.1.1, Feb. 2012, pp. 37.

"Qualcomm, Design details for light connection model A", TDoc R2-168345.

"Technical Specification Group Services and System Aspects", Architecture enhancements for V2X services (Release 14), TS 23.285, V14.1.0, Dec. 2016.

Dahlman, Erik et al., "Part 1 of 3—4G, LTE-Advanced Pro and the Road to 5G", Elsevier, 3rd Edition, 2016.

Dahlman, Erik et al., "Part 2 of 3—4G, LTE-Advanced Pro and the Road to 5G", Elsevier, 3rd Edition, 2016.

Dahlman, Erik et al., "Part 3 of 3—4G, LTE-Advanced Pro and the Road to 5G", Elsevier, 3rd Edition, 2016.

Firmin, Frederic, "NAS, 3GPP", http://www.3gpp.org/technologies/keywords-acronyms/96-nas.

Sesia, Stefania et al., "Part 1 of 3—LTE The UMTS Long Term Evolution", From Theory to Practice, 2nd ed. Wiley, 2011.

Sesia, Stefania et al., "Part 2 of 3—LTE The UMTS Long Term Evolution", From Theory to Practice, 2nd ed. Wiley, 2011.

Sesia, Stefania et al., "Part 3 of 3—LTE The UMTS Long Term Evolution", From Theory to Practice, 2nd ed. Wiley, 2011.

Zhang, Jian et al., "LTE Small Cell Enhancement by Dual Connectivity", Wireless World Research Forum, White Paper, Nov. 2014.

Yue, P.C, "An inter sattelite link handover management scheme based on link remaining time", IEEE, Oct. 17, 2016.

Zhou, Chang-Yong, "On the cellular signaling based transport trajectory matching technologies in urban area", Master Dissertation by C.-Y. Zhou, Southwest Jiaotong University, 2013, containing an English abstract.

* cited by examiner

| Information Element | Target eNB/gNB-1 | Target eNB/gNB-2 | Target eNB/gNB-N |
|---|---|---|---|
| Common UE Parameters | | | |
| Physical Cell ID | ID 1 | ID 2 | ID N |
| Encrypted Security Update (Layer 2) | Key 1 | Key 2 | Key N |
| Valid Timeout Indicator set by Source/Anchor eNB/gNB of expected UE arrival in respective Target eNBs | $t11 < t < t21$<br>T1 (timeout) | $t12 < t < t22$<br>T2 (timeout) | $t1n < t < t2n$<br>TN (timeout) |
| V2X SL Transmission Configuration (optional) | SL Config 1 | SL Config 2 | SL Config 3 |
| RAN Paging Area ID | PA 1 | PA 1 | PA 2 |
| Anchor eNB/gNB | ACK/NACK | ACK/NACK | ACK/NACK |
| UE (High Speed Mobility) | | | |
| Unique-UE-ID (based on RAN Paging) | Constant UE-ID | Constant UE-ID | Constant UE-ID |
| RACH Configuration Preamble (Dependent on RACH Load and reusablility of preambles) | Constant RACH Preamble RC | Constant RACH Preamble RC | Constant RACH Preamble RC |
| UE (Low Mobility) | | | |
| C-RNTI | C-RNTI 1 | C-RNTI 2 | C-RNTI N |
| RACH Contention Free Preamble | R1 | R2 | RN |

Fig. 7

PREEMPTIVE HANDOVER PREPARATION AND TRACKING/PAGING AREA HANDLING AND INTELLIGENT ROUTE SELECTION IN A CELLULAR NETWORK

CROSS-REFERENCE TO RELATED APPLICATIONS

This application is a continuation of copending International Application No. PCT/EP2018/000109, filed Mar. 22, 2018, which is incorporated herein by reference in its entirety, and additionally claims priority from European Application No. 17162641.9, filed Mar. 23, 2017, which is also incorporated herein by reference in its entirety.

BACKGROUND OF THE INVENTION

The present application is concerned with a concept for handovers in cellular networks, a concept for improved handling of tracking/paging/RAN notification areas for, for instance, user entities in inactive modes and a concept for enabling intelligent route selection in cellular networks.

Handovers of connections such as an ongoing call or a data session, or a user entity from one cell to another is an oft-occurring process and the control signaling used to establish such handovers consumes a considerable amount of the available radio and network resources and currently has an undesirable high latency for high reliability communications. Any reduction in the control signaling overhead and/or latency would be desirable.

Handovers take place in an activated mode of a user entity. Most of the time, however, user entities are not in an active mode or, differently speaking, most of the time there is no need for a continuous data communication for a user entity, but rather, discontinuously or intermittently, packets of a certain data session, are to be transmitted to/from the user entity. In such a case, continuously performing handovers might be unnecessary as long as a user entity is within a certain tracking/paging area. Merely when leaving the tracking/paging area, the user entity informs the cellular network on its new location or position. This entails, however, power consumption by the user entity and accordingly, it would be desirable to have a concept at hand which allows for reduction in this power consumption.

SUMMARY

An embodiment may have a cellular network supporting a preemptive preparation of a handover for a user entity.

Another embodiment may have a cellular network apparatus, configured to analyze a predetermined set of cells around a position of user entity with respect to a set of possible routes leading away from the user entity's position to determine a favorite route among the set of possible routes in terms of connectivity of the user entity; and provide for the user entity information about the favorite route.

Another embodiment may have a user entity for communication over a cellular network, wherein the user entity is configured to gain information on a predicted future route of the user entity and inform the cellular network on the predicted future route.

Another embodiment may have a user entity for communication over a cellular network, wherein the user entity is configured to manage a set of one or more preemptively prepared handovers.

Another embodiment may have a base station of a cellular network configured to determine a preliminary set of one or more target base stations of the cellular network based on a predicted future route of a user entity currently connected to the cellular network via the base station or triggered by the user entity entering a predetermined area, query each of the preliminary set of one or more target base stations regarding an accessibility of the cellular network via the respective target base station, receive, from each of the preliminary set of one or more base stations, an answer to the query, sending to the user entity a schedule indicating, for each of a set of one or more base stations within the preliminary set, a temporal access interval and one or more access parameters indicating that the user entity may access the cellular network via the respective base station during the temporal access interval using the one or more access parameters, cutting, upon receipt of an access confirmation from any of the set of one or more base stations, a connection to the user entity.

Another embodiment may have a cellular network configured to establish for a predetermined user entity a schedule of a time-varying tracking/paging area spanned by a time-varying set of one or more base stations, or to establish the time-varying tracking/paging area and provide the user entity with updates on changes of the time-varying tracking/paging area.

Another embodiment may have a cellular network configured to determine for a predetermined user entity a tracking/paging area depending on a predicted future route of a user entity.

Still another embodiment may have a user entity for communicating over a cellular network, wherein the user entity is configured to continuously check a schedule of a time-varying tracking/paging area whether the user entity leaves the time-varying tracking area and send a tracking/paging area update message to the cellular network in case of the user entity leaving the time-varying tracking/paging area.

Another embodiment may have a method for operating a cellular network having preemptively preparing a handover for a user entity.

According to another embodiment, a method for operating a cellular network may have the steps of: analyzing a predetermined set of cells around a position of user entity with respect to a set of possible routes leading away from the user entity's position to determine a favorite route among the set of possible routes in terms of connectivity of the user entity; and providing information about the favorite route for the user entity.

According to another embodiment, a method for communication over a cellular network may have the steps of: gaining information on a predicted future route of the user entity and informing the cellular network on the predicted future route.

Another embodiment may have a method for communication over a cellular network, having managing a set of one or more preemptively prepared handovers.

According to still another embodiment, a method of operating a base station of a cellular network may have the steps of: determining a preliminary set of one or more target base stations of the cellular network based on a predicted future route of a user entity currently connected to the cellular network via the base station or triggered by the user entity entering a predetermined area, querying each of the preliminary set of one or more target base stations regarding an accessibility of the cellular network via the respective target base station, receiving, from each of the preliminary set of one or more base stations, an answer to the query, sending to the user entity a schedule indicating, for each of a set of one or more base stations within the preliminary set, a temporal access interval and one or more access parameters indicating that the user entity may access the cellular network via the respective base station during the temporal access interval using the one or more access parameters, and cutting, upon receipt of an access confirmation from any of the set of one or more base stations, a connection to the user entity.

According to another embodiment, a method for operating a cellular network may have the step of: establishing for a predetermined user entity a schedule of a time-varying tracking/paging area spanned by a time-varying set of one or more base stations, or establishing the time-varying tracking/paging area and providing the user entity with updates on changes of the time-varying tracking/paging area.

According to another embodiment, a method for operating a cellular network may have the step of determining for a predetermined user entity a tracking/paging area depending on a predicted future route of a user entity.

According to another embodiment, a method for communicating over a cellular network may have the steps of: continuously check a schedule of a time-varying tracking/paging area whether the user entity leaves the time-varying tracking area and send a tracking/paging area update message to the cellular network in case of the user entity leaving the time-varying tracking/paging area.

Another embodiment may have a non-transitory digital storage medium having stored thereon a computer program for performing a method for operating a cellular network having preemptively preparing a handover for a user entity, when said computer program is run by a computer.

The present application provides, in accordance with a first aspect of the present application, a concept for improved handovers in a cellular network. This object is achieved by the subject matter of the independent claims of the present application in accordance with the first aspect of the present application.

In accordance with a second aspect of the present application, the present application provides a concept for an improved handling of user entities which are not in an active state.

One idea underlying some of the embodiments of the present application in accordance with the first and second aspects aims at achieving the above-identified improvements, by using a prediction of a future route of a user entity to improve the handover handling and/or the handling of non-active user entities, respectively. In particular, being able to exploit a predictive future route of the user entity allows for preemptive preparation of one or more handovers on the side of the cellular network. This, in turn, alleviates the control data overhead and/or reduces latency incurred by handovers. Such predictive future routes may also be advantageously used, for instance, in setting-up a time-varying tracking/paging area within which the user entity is allowed to stay without any need for keeping the cellular network updated on the exact cell within the tracking/paging area within which the user entity currently resides. This, in turn, may reduce the power consumption occurring in the user entity for indicating to the cellular network any departure from the tracking/paging area as the tracking/paging area may be adapted better to the route actually taken by the user entity.

A further idea which underlies some of the embodiments of the present application in accordance with the first aspect is the fact that a preemptive preparation of a handover enables the reduction in the amount of control signaling for handovers wherein, depending on these situations where such preemptive preparation of handovers is performed, the possible wastage of network resources which might be incurred by the preemptive preparation of the handovers in order to, for example, meet a certain promise that the user entity may access the cellular network at a predetermined temporal access interval using one or more access parameters at a certain base station of the cellular network, may be kept comparatively low.

In particular, a preemptive preparation of handovers avoids, for a short-term or mid-term future, control signaling for handovers which will very likely occur with respect to a certain user entity. This, in turn, reduces control signaling at base stations for which the preemptive preparation of the handover has been performed, and reduces or avoids otherwise possibly occurring latency due to, for instance, the performance of handover related protocol signaling which then has to take place anytime just before the user entity seeks to move to the next cell. Naturally, this idea may be combined with the first idea so as to improve the selection of the set of base stations with respect to which the preemptive preparation of handovers is performed. Additionally or alternatively, the fact that the user entity enters a predetermined area may be identified as a circumstance where a preemptive preparation of a handover is favorably performed. For instance, such a predetermined area may be associated with a very high likelihood that the user entity will, in a near future, enter the cell of a predetermined other, i.e. target, base station and accordingly, performing a preemptive preparation of a handover towards this base station, may favorably reduce otherwise-occurring handover latency and/or control signaling associated with the handover.

Even additionally or alternatively, a further idea underlying some embodiments of the present application in accordance with the first and second aspects is the fact that some sort of scheduling of a tracking/paging area and/or handovers with respect to time, may alleviate the control signaling otherwise occurring if the scheduling would be replaced by a passive triggering of otherwise used tracking/paging area updates and handovers, namely, merely when needed. This idea may, obviously also be combined with the idea of exploiting a prediction of a future route of the user entity.

In accordance with a further aspect of the present application, the present application provides an improved concept for serving a user entity via a cellular network; namely, in a manner increasing the connectivity of the user entity. This object is achieved by the subject matter of the independent claim of the third aspect.

In particular, an idea on which embodiments of the third aspects are based, is that an analysis of a predetermined set of cells around a position of a user entity with respect to a set of possible routes leading away from the user entity's position to determine a—in terms of some predetermined criterion or criteria—favorite route among the set of possible routes in terms of connectivity of the user entity and providing for the user entity information about the favorite route, may be used to provide users of such a user entity with the opportunity to take this favorite route into account in planning their further journey; namely, in a manner taking into account the connectivity of the user entity and the time to come. The thus selected route could, for instance, be called a best connected/served route.

BRIEF DESCRIPTION OF THE DRAWINGS

Embodiments of the present application are described below with respect to the Figures, in which:

FIG. 7 shows a table illustrating a possible signaling of preemptively prepared handovers in accordance with an embodiment;

DETAILED DESCRIPTION OF THE INVENTION

In the following, various embodiments of the present application are described. These embodiments relate to different aspects of the present application, namely the aspect of efficiently handling handovers, the concept of efficiently controlling tracking/paging areas within which user entities may efficiently reside in a non-active mode, and the concept of providing users of user entities with the opportunity to take the aim of a good connectivity into account in selecting the route to be taken in the time to come.

The description of these embodiments starts with an introduction and a technical overview with respect to the first concept relating to handovers. In general, a base station can be referred to as eNB (naming in the LTE context) or gNB (naming in the NR/5G context). In the following, it is not distinguished between these three terms. A user terminal/mobile user can be referred to as user equipment or user entity (UE).

There can be loss of connectivity during handovers in New Radio (NR) for 5G, especially for cases involving vehicular traffic, e.g. cars, busses, trucks, autonomous driving, drones and unmanned aerial vehicles (UAVs), planes, etc. The problem is threefold:

1. The number of vehicles is increasing, causing increased signaling demand for handover processes (HOs),
2. The new mobility services, e.g. assisted driving etc., introduce new service requirements in terms of traffic models, e.g. reliability constraints like packet error rates (PER), throughput demands and packet sizes (e.g. high numbers of small control packets) as well as more stringent latency constraints,
3. State-of-the-Art handover (HO) is not optimized fully, since information wrt. localization (indoor and outdoor) as well as of traffic routes has vastly improved over the past years and enables track prediction of UEs connected to the cellular infrastructure. This is more the case for autonomous UEs with cloud connectivity, which have a tight communication link via wireless.

Significant HO overheads are caused when vehicles are rapidly moving across different cells during a given period. It would be favorable to improve the mobility services for vehicular/airborne UEs, which are in connected/active or lightly connected/inactive mode, especially in scenarios with vehicle-to-infrastructure (V2X), vehicle-to-vehicle (V2V) and Unmanned Aerial Vehicle (UAV) scenarios.

These services shall be enhanced in order to improve performance and enhance reliability of the handover (HO) procedure through signaling procedures that specifically introduce prediction and improve the reliability of UE context transfer to the target eNBs during the predictive HO procedure.

Figure 1:
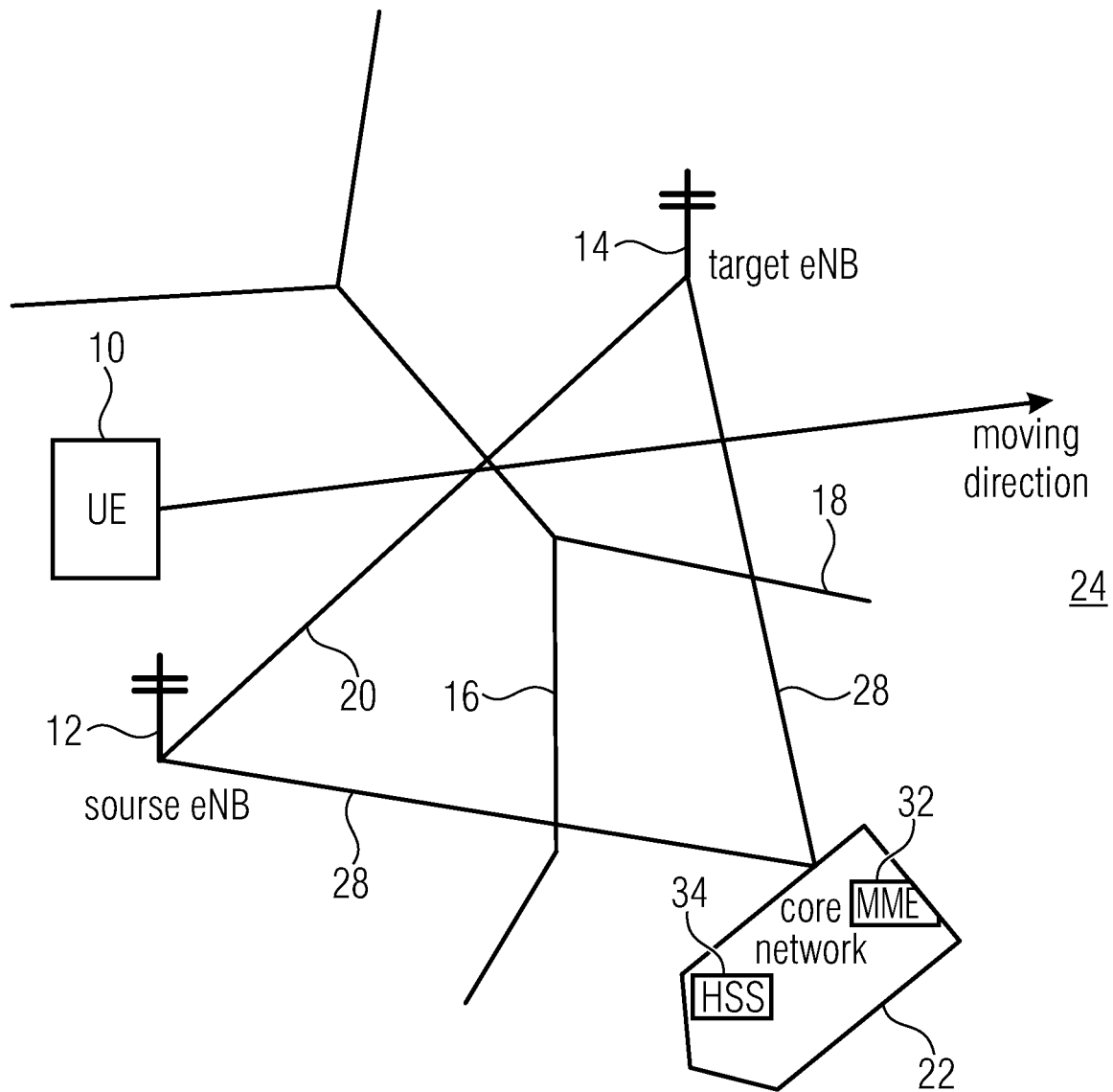
FIG. 1 shows a schematic block diagram illustrating a cellular network and a UE within the cellular network in order to illustrate a handover (HO)

The current HO procedures in LTE are designed to cater for scenarios where a UE transitions from a source eNB 12 to the target eNB 14 as indicated in FIG. 1 or from a cell 16 of eNB 12 to a cell 18 of eNB 14. The focus of this invention is on Intra-RAT HO procedures while Inter-RAT mobility is not precluded.

There are two types of HO procedure in LTE for UEs in active mode:
1. the X2-handover procedure,
2. the S1-handover procedure.

Figure 2:
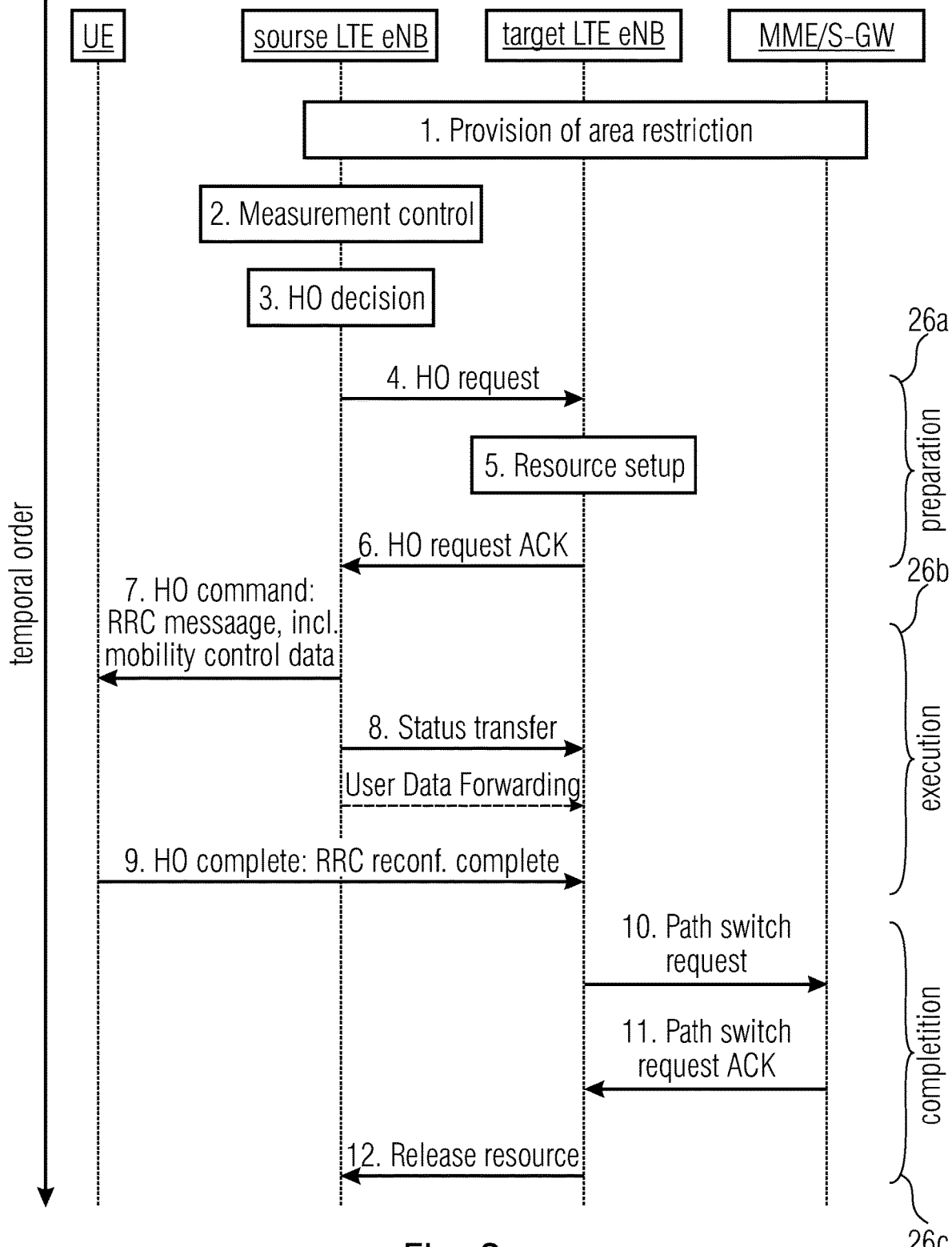
FIG. 2 shows a temporal order of steps performed in a handover process; namely, an X2-based HO procedure according to [1] [6] wherein the diagram of FIG. 3 distinguishes, by arranging the different entities participating in the HO procedure, side by side between the side or entity at which a certain step is performed or from whom to whom a certain signal is sent at a certain step, with a number of steps illustrated in FIG. 2 being 12.

1. X2-based HO: The X2-handover procedure is illustrated in FIG. 2 and is normally used for the intra-eNB handover. The handover is directly performed between two eNBs via an X2 interface 20 connecting both eNBs 12 and 14, which makes the preparation phase quick. The MME as part of a core network 24 of the cellular network 24 which also comprises the eNB 12 and 14 is only informed at the end of the HO procedure 26, once the HO is successful in order to trigger the path switch. Release of resources at the source side is directly triggered from the target eNB. The X2-handover procedure 26 consists of 3 basic phases:
  1) Preparation phase 26a (steps 4-6),
  2) Execution phase 26b (steps 7-9),
  3) Completion phase 26c (after step 9).

An overview of X2-based handover procedures based on FIG. 2 is outlined below:
1. The Source eNB 12 contains the UE context which consists of information related to area roaming and access restrictions and was initially provided during the connection establishment or Tracking Area (TA) update.
2. The UE measurement procedures can be configured via the SeNB and assist with the UE's connection mobility.
3. The Source eNB receives a measurement report from the UE as well as Radio Resource Management (RRM) Information to enable whether a HO decision is performed.
4. The source eNB issues a HO REQUEST message to the target eNB passing information entailed to prepare the HO at the target side. This information may include UE X2 signaling context reference at source eNB, UE S1 EPC (Evolved Packet Core) signaling context reference, target cell ID, $K_{eNB^*}$, RRC (Radio Resource Control) context including the C-RNTI (Cell-Radio Network Temporary Identifier) of the UE in the source eNB, AS (Access Stratum)-configuration, E-RAB (E-UTRAN Radio Access Bearer) context and physical layer ID of the source cell+short MAC-I (Message Authentication Code) for possible RLF (Radio Link Failure) recovery. UE X2/UE S1 signaling references enable the target eNB to address the source eNB and the EPC. The E-RAB context includes RNL (Radio Network Layer) and TNL (Transport Network Layer) addressing information, and QoS (Quality of Service) profiles of the E-RABs.
5. Resource setup primarily configures resources to query if the resources can be granted by the target eNB and also performs admission control on the received E-RAB QoS information to increase likelihood of a successful HO. "The target eNB configures the used resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration")".
6. "The target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if applicable. NOTE: As soon as the source eNB receives the HANDOVER REQUEST ACKNOWLEDGE, or as soon as the transmission of the handover command is initiated in the downlink, data forwarding may be initiated."
7. "The target eNB generates the RRC message to perform the handover, i.e. RRCConnectionReconfiguration message including the mobilityControlInformation, to be sent by the source eNB towards the UE. The source eNB performs the integrity protection and ciphering of the message. The UE receives the RRCConnectionReconfiguration message with parameters used (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB."
8. "The source eNB sends the SN (Sequence Number) STATUS TRANSFER message to the target eNB to convey the uplink PDCP (Packet Data Convergence Protocol) SN receiver status and the downlink PDCP SN transmitter status of E-RABs for which PDCP status preservation applies (i.e. for RLC AM (Acknowledge Mode)). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation."
9. When the UE has successfully accessed the target cell, the UE sends the RRCConnectionReconfigurationComplete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfiguration-Complete message. The target eNB can now begin sending data to the UE.
10. "The target eNB sends a PATH SWITCH REQUEST message to MME to inform that the UE has changed cell."
11. "The MME confirms the PATH SWITCH REQUEST message with the PATH SWITCH REQUEST ACKNOWLEDGE message."
12. "By sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME."

Figure 3:
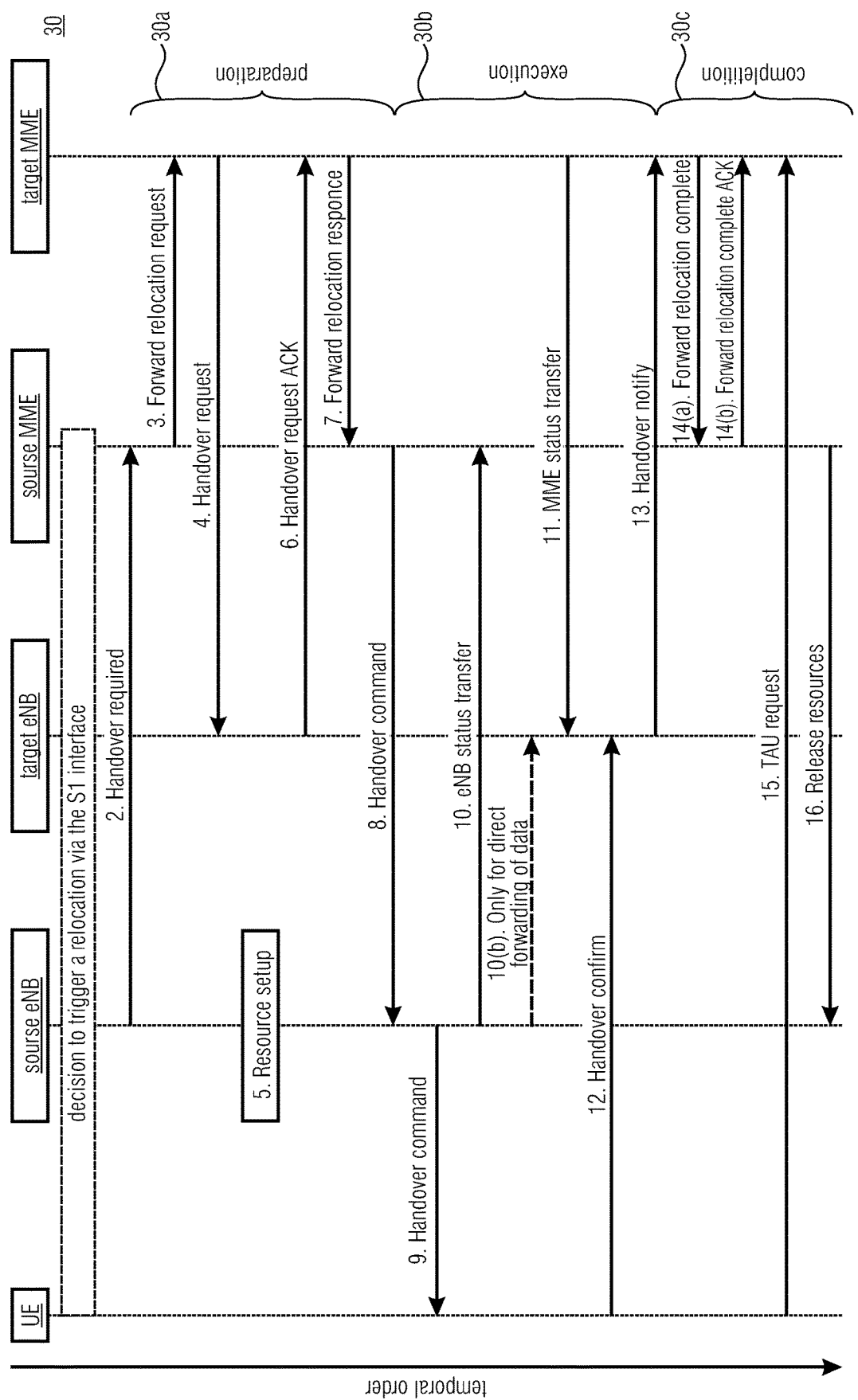
FIG. 3 shows a temporal order of steps in a manner similar to FIG. 2 but here an S1 based HO procedure according to [1]

However, when there is no X2 interface 20 between the eNBs (e.g. legacy eNBs 12 and 14 based on UTRAN architecture), or if the eNB 12 has been configured to initiate the handover towards a particular target eNB via the S1 interface 28 which connects the eNBs with the core network 22, then the S1 handover procedure illustrated in FIG. 3 will be triggered. The S1-handover procedure consists of 3 basic phases:

1) Preparation phase 30*a* involving the core network, e.g. EPC, where the resources are first prepared at the target side (steps 2-8),
2) Execution phase 30*b* (steps 8-12),
3) Completion phase 30*c* (after step 13).

As an overview of S1-based HO Handover Procedures reference is made to [6]. For a detailed description also refer to the steps of the previous X2-based HO procedure.

As to Steps 13-15, it is noted that some are special to the S1-based HO 30, and comprise of acknowledgement and update information to the target MME.

Next, UE context transfer in 4G/5G is referred to.

The radio resource control (RRC) context transfer is an important procedure of the HO process. The MME 32 as a part of the core network 22 creates a UE context when a UE 12 is switched on and subsequently attempts to connect to the network 24. A unique short temporary identity is assigned, also known as the SAE Temporary Mobile Subscriber Identity (S-TMSI), to the UE 12 that identifies the UE context in the MME 32. This UE context contains user subscription data originally obtained from a Home Subscriber Server 34 (HSS) also being part of the core network 22. The local storage of subscription data in the MME 32 enables faster execution of procedures such as bearer establishment since it removes the need to consult the HSS every time. In addition, the UE context also holds dynamic information such as the list of bearers that are established and the terminal capabilities [2]. During the P-HO process, the eNB 12 would be used to forward the UE's radio resource control (RRC) context to subsequent target eNBs such as eNB 14.

After having described, rather generally, the task of handovers in cellular networks and how these handovers were treated so far in LTE, in the following, the description of the present application provides a presentation of embodiments relating to this task which achieve an improvement over these handover mechanisms used in LTE so far in terms of control signaling overhead on the one hand and/or handover-related latency on the other hand.

Later on, the description proceeds with a description as to how some of the embodiments might be embedded into, or implemented to address various specifics associated with, nowadays mobile networks.

Figure 4:
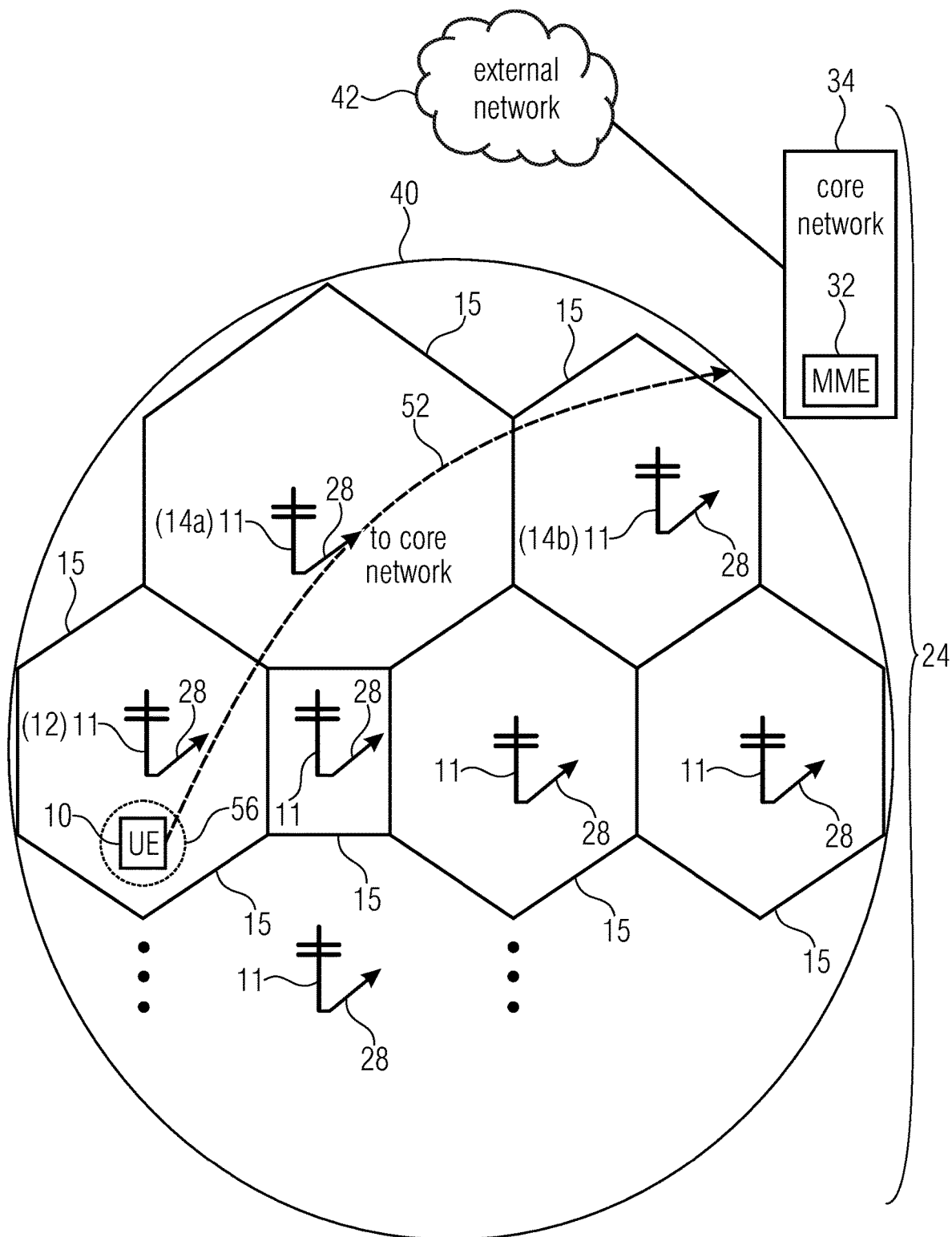
FIG. 4 shows a schematic block diagram illustrating a cellular network and a UE communicating with the same, wherein FIG. 4 also shows the UE as being currently connected to the cellular network via a source base station and as moving to other base stations of the cellular network which, thus, form target base stations with respect to which an handover is to be performed, wherein the cellular network, the UE and the base stations shown in FIG. 4 may be embodied according to the present application.

FIG. 4 shows in a manner reusing the reference numbers of FIG. 1 for entities fulfilling the same task in the overall system shown in FIG. 4, a cellular network 24 comprising a plurality of base stations 11 spatially spread so that their cells 15, within which each base station 11 serves user entities residing in the respective cell 15 so as to connect them to the cellular network 24 by wireless communication, cover a certain region or area such as a geographical region 40 in a manner so that cells 15 abut or overlap each other. The cells 15 are quasi-defined by the respective wireless communication reach of each base station 11. The cellular network of FIG. 4 also comprises a core network via which, and to which, each base station 11 is connected via a respective interface 28 such as some cable based network such as electrical or optical cables. As already described with respect to FIG. 1, the base stations 11 might be connected to each other directly, too, such as via interface 20 shown in FIG. 1 which might be cable-based or wireless such as an optical connection.

FIG. 4 also shows a user entity or user equipment 10. It is currently served by base station 12. That is, base station 12 is a special base station 11 with respect to UE 10, namely the source base station 12. That is, UE 10 is located within cell 15 of base station 12 and base station 12 communicates with the UE 10 via radio resources it assigns to UE 10. The share of radio resources assigned to UE 10 depends on many factors such as subscriber data of UE 10, number of further UEs currently served by base station 10 and so forth. It is assumed that UE 10 is currently in a connected or active mode. That is, UE 10 has, for instance, one or more current communication sessions running such as a call and/or data session. That is, the UE 10 which might be a mobile phone, a laptop or some other mobile or non-mobile device, may have one or more applications such as computer programs or the like, running thereon which communicate via base station 12 over network 34 with some third party which might be an entity within the cellular network 24, but may alternatively be a third party device being external to the cellular network 24 and connected to core network 34 via the Internet or some other external network 42. The core network 34 or some entity within core network 34 such as MME 32 contains or manages a context for each UE 10 currently served within region 40. For instance, such context or context data could indicate which sessions are currently active with respect to each UE, at which base station 11 the respective UE is served, i.e., via which base station 11 the respective UE is connected to the cellular network 24, and/or further information such as subscriber data or the like. In order to associate such contexts with the associated UEs, core network 34 assigns identifiers to the UEs. The currently serving base station 12 also knows about, or stores, the context of UE 10 and knows about the ID used within core network 34 with respect to UE 10. Based on the context data, core network 34 is able to forward packets of any communication session associated with UE 10 towards base station 12, which, in turn, forwards the same wirelessly to UE 10.

The cellular network 24 of FIG. 4 is configured to support a preemptive preparation of a handover for user entity 10. This means the following. It might be, that cellular network 24, optionally, has the afore-mentioned functionality of initiating a handover of UE 10 to another, i.e., a target base station; namely, one of the neighboring base stations neighboring base station 12, on the basis of an evaluation of measurements made by the UE 10 which measure the connection quality between UE 10 and base station 12 as well as between UE 10 and any of the neighboring base stations 11, provided the UE 10 is within the reach of the respective neighboring base station 11. Such passive activation would mean that the cellular network 24 comes to the conclusion that a handover to such a neighboring target base station would be advantageous according to some criteria such as connection quality and/or other criteria. The cellular network 24 of FIG. 4, however, supports a speculative or preemptive preparation of a handover for a user entity such as user entity 10. When preemptively preparing a handover for user entity 10, the cellular network 24 establishes, for each of a set of one or more target base stations 14*a* and 14*b* of the cellular network 24, a temporal access interval and one or more access parameters so that the user entity 10 may access the cellular network 24 via the respective base station 14*a*, 14*b* during the temporal access interval using the one or more access parameters established for the respective base station. This means, that for such a set of base stations 14*a*, 14*b*, the handover is, as far as the cellular network's side is concerned, already done. It is merely up to the UE 10 or up to other circumstances discussed further below, whether the access opportunity provided within the temporal access intervals using the one or more access parameters for base stations 14a, 14b is actually used by UE 10. The target base stations 14a, 14b to which a handover has been preemptively prepared, reserve a certain access channel or radio access channel using the one or more access parameters established for the respective base station during the temporal access interval.

Figure 5:
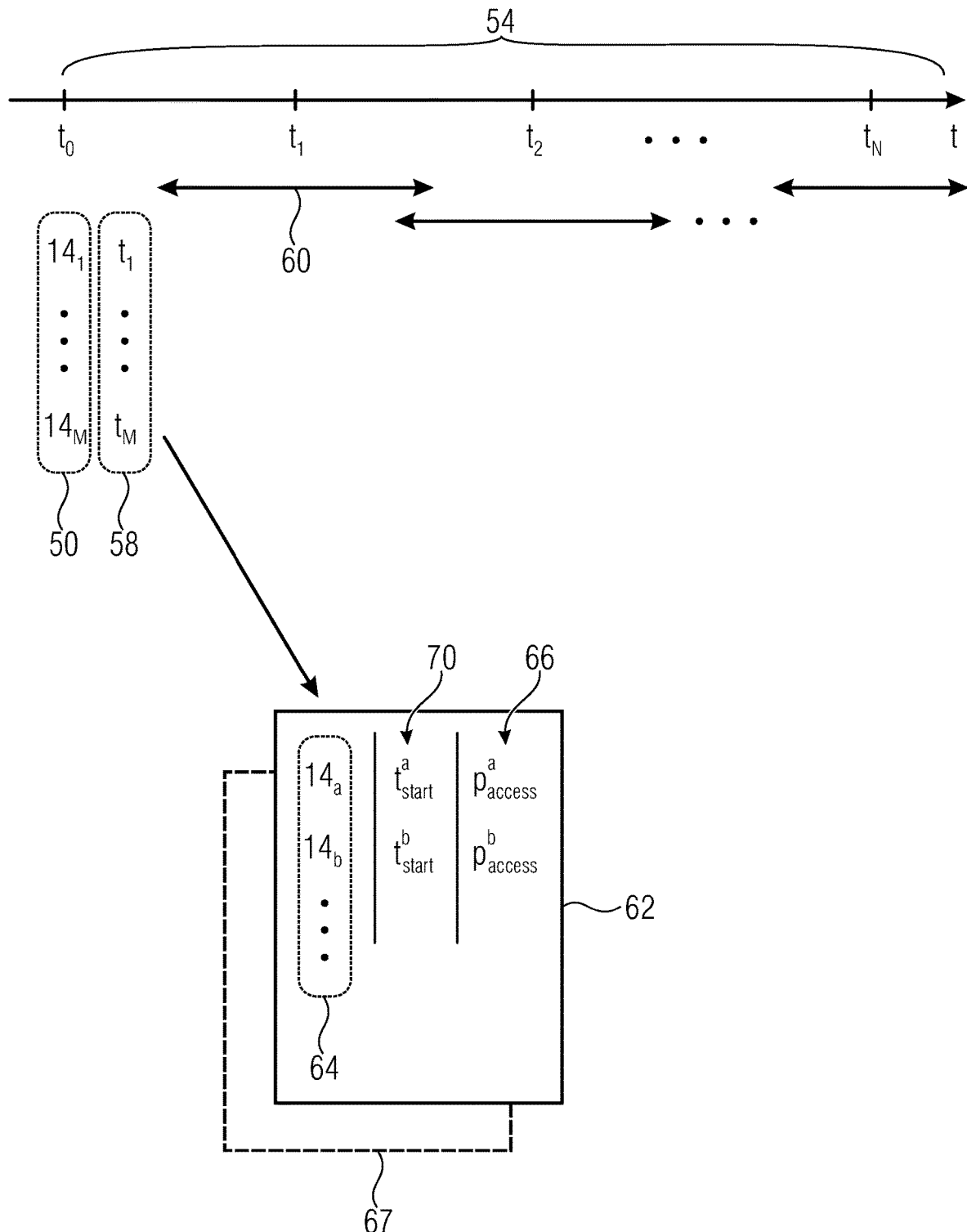
FIG. 5 shows a schematic diagram illustrating the preemptive preparation of handovers realized by the entities presented in FIG. 4 in accordance with an embodiment.

To have a better understanding of this, reference is made to FIG. 5. FIG. 5 shows the process of preemptive preparation of the handover by way of establishing respective temporal access interval and one or more access parameters for one or more target base stations by illustrating the temporal sequence of steps performed along a temporal access t. As shown in FIG. 5, the preemptive preparation of a handover is triggered at a time instant $t_0$. In other words, at this time instant $t_0$, the cellular network determines a preliminary set 50 of one or more base stations of the cellular network with respect to which a preemptive preparation of a handover might be performed. This preliminary set 50 of base stations is determined by the cellular networks so that their cells 15 cover an area where the UE 10 will probably move in the next future upon leaving the cell of current source base station 12. As described later on, for instance, cellular network 24 may determine the preliminary set 50 depending on information on a predicted future route of the user entity. In FIG. 4 such a predicted future route is illustrated using a dashed line 52. The same crosses the cells of base station $14_a$ and $14_b$. FIG. 5 illustrates the preliminary set 50 to be composed of, generally, base stations $14_1$ ... $14_M$ with M≥N. The temporal length of the predicted future route 52 may cover a certain temporal interval 54 starting from time instant $t_0$ and lasting, for instance, for more than 10 seconds, 1 minute or even 5 minutes. The temporal length 54 might be determined variably as well and might be adapted, for instance, to the prediction accuracy of the predicted future route 52. The cellular network might receive the information on the predicted future route 52 of the user entity 10 from the user entity 10 itself such as, for instance, from an application running on the user entity or a certain component thereof being able to determine the position of the user entity 10 such as a navigation system or the like, or from some other module of the UE. The information transmission may take place during RRC Connection establishment, for instance. Alternatively, information on the predicted future route 52 of the user entity 10 might come from a device other than the cellular network 24 and the user entity 10. Such other device could be, for instance, a system which tracks the user entity 10, but resides external to cellular network 24. The information could be provided, for instance, by an external entity such as a V2V/V2X server, or from an over-the-top (OTT) entity such as Google®. It might even be that the other device is responsible for granting allowance for the future route 2 such as a traffic management system which could be, for instance, responsible, for flight routes of drones as examples for UEs or the like. Additionally or alternatively, the cellular network 24 may determine the predicted future route 52 of the user entity itself such as by triangulation applied onto signals sent by the UE 10 and received by several of the base stations 11 or the like, or by extrapolating path 52 from a past travel path of UE 10 defined by updates on the UE's current position which the network 24 receives from the UE 10. The derivation of the predicted future route 52 may involve, in any case, irrespective of the entity performing the derivation, a type of extrapolation or prediction on the basis of additional information in addition to a current position of the user entity 10 such as a route taken by the UE 10 immediately up to time instant $t_0$, map data indicating a map of region 40 such as a street map or the like, and/or user preference data associated with the UE 10 having been gathered based on an evaluation of routes taken by the UE 10 in the past. Preliminary set 50 would then be determined so that the base station's cells within the set 50 would be crossed by route 52. The UE 10 is, thus, likely to need a handover at at least a subset of base stations of set 50. It should be noted, however, that set 50 may, alternatively, be determined by the cellular network 24 by means other than based on an evaluation of predicted future route 52. The predicted route 52 could, for instance, be determined by a V2X broadcast server, or using information from other mobile users, e.g. by sensor fusion of a set of predicted routes from multiple UEs. Further, base station 12 could be configured to request the route vector 52 as a kind of measurement report, including route updates and top-m routes e.g. route 1, route 2, route 3, ....

The use of route 52 for determining set 50 is not necessary. For instance, the mere fact or circumstance that UE 10 enters a certain predetermined area 56 may be an indicator that there is a high probability that the user entity 10 will be, during a certain time interval 54 following time instant $t_0$ at which the UE 10 entered area 56, in a certain area, or will travel along a certain path or route so that set 50 could be automatically determined albeit fixedly associated with, the event of UE 10 entering area 56 at time instant $t_0$. For instance, the area 56 could be one end of a street without any crossing until reaching, via a certain path 52, namely the street, a first crossing and accordingly, as soon as the UE 10 enters the street at this point, it is very likely that the UE 10 will follow this route/street 52. Similarly, imagine a UE 10 enters a tunnel at a first end and the tunnel being long so as to lead to another cell. While it might be unknown which street the UE takes after the tunnel, it is very likely that the UE will continue its journey after the tunnel and accordingly, set 50 could be determined so as to cover base stations surrounding that side of the tunnel.

Even alternatively, the prediction that there is a high probability that the user entity 10 will be, during some time interval 54 following a time instant $t_0$, in a certain area, or will travel along a certain path or route, could be triggered on the basis of an evaluation of a history of a route of the CE in the past such as a time interval preceding, or even immediately preceding, time instant $t_0$. In addition to the user entity 10 entering area 56, for instance, a current heading direction of UE 10 could be taken into account so as to trigger a preemptive HO preparation merely in case of the heading direction pointing into a certain direction or field of directions in addition to UE entering 56. For instance, preemptive preparation of HO could be triggered by the user entity coming from predetermined area 56. Generally speaking, a history of UE positions could be evaluated in order to see whether this history meets some criteria and if so, preemptive HO could be initiated. The history of positions may be logged in any granularity or accuracy. For instance, a previous set of serving base stations or a list of previous base stations along the route of the user entity, i.e. some mobility history, could be used to this end. Irrespective of area driven or history-of-positions driven, the triggering could be done based on matching current UE's position, current UE's heading direction and/or most recent history of UE positions against one or more predetermined criteria which are independent from the most recent connection quality measured by the UE with respect to its communication connection to the source base station 12 and/or any surrounding base station 11.

That is, along with determining the preliminary set 50 of base stations, cellular network 24 determines for each base station within set 50 an expected time $t_1 \ldots t_M$ at which the user entity enters the respective base station's cell 15, i.e., is within its reach. Accordingly, base station 12, i.e., the source eNB, queries each of the preliminary set 50 of target base stations regarding an accessibility of the cellular network 24 via the respective target base station at the respective expected time $t_i$. As an outcome of this query, base station 12 of cellular network 24 receives from each of the preliminary set 50 of base stations, an answer to the query. While there may be none, one, or more than one base station within preliminary set 50 which denies the accessibility, there may be a set of base stations, let's say N base stations with N≥1 and N≤M which answer the query by way of indicating a temporal access interval 60 at which the respective base station is accessible by user entity 10 provided that user entity 10 uses the one or more access parameters indicated by the respective base station in the answer to the query. For instance, FIG. 5 illustrates that a certain access interval 60 overlaps a first expected time $t_1$. A base station of set 50 within the cell of which the user entity 10 is expected to be as time instant $t_1$, thus, allows user entity 10 to access the cellular network 24 using one or more access parameters via correspondingly reserving respective access radio resources during time interval 60. The same might apply for the other expected times when the associated target base stations may all be different for the expected times, but this is not necessarily the case. After the query and the answers thereto, base station 12 is, thus, able to send to the user entity 10 a schedule 62 which indicates, for each of the set 64 of one or more base stations for which a temporal access interval 60 and one or more access parameters 66 have been determined, the temporal access temporal interval 60 as well as the one or more access parameters. This schedule 62 indicates to the user entity 10 that the same may access the cellular network 24 via the respective base station $14_x$ during the temporal access interval indicated, for instance, by its beginning or start at $t^x_{start}$ using the associated one or more access parameters $p^x_{access}$ with x being element of {a, b ... }, i.e. being an index into set 64. In other words, schedule 62 could be submitted as an ordered list of elements, the elements having a temporal dependency, or the schedule 62 could be submitted as a set of elements. An even alternatively, schedule 62 could be submitted as a list of lists or sets which may be ranked, e.g. top-m. Each such element would then be associated with a certain target base station, define its access interval 60 and the one or more access parameters 66. Thereinafter, i.e. of submission of schedule 62 to UE 10, the preemptive preparation or one or more handovers is finished and the user entity has been notified thereabout and it is, from the sending of the schedule 62 to the user entity onwards, up to the user entity 10, whether or not the user entity uses the access opportunities during intervals 60 to handover itself from one base station to the next, or, from a different perspective, it is up to the user entity to exploit these opportunities provided that other external circumstances did not prevent user entity 10 from exploiting these opportunities because, for instance, the prediction of route 52 of the forecast on the basis of the event of UE 10 entering area 56, turned out not to be correct.

For the sake of completeness only, it should be noted that the time consumed by querying the base stations of set 50 and obtaining the answers up to sending schedule 62 may be negligible compared to the temporal length 54 within which the one or more expected times $t_i$ are distributed. The schedule 62 may define a certain temporal access 60 by indicating, for instance, its start time $t^x_{start}$ wherein an end of the temporal access interval 60 could implicitly be defined by a maximum length of each interval 60. In other words, the respective base station $14_x$ could close the access opportunity after a certain time after $t^x_{start}$. The temporal end of interval 60 could be indicated, too, however in the schedule 62.

As described later on, the query sent from base station 12 to the target base stations of set 50 may possibly contain one or more current identifiers using which the user entity 10 is identified in the cellular network such as, for instance, an identifier via which the user entity 10 is identified in the core network 34 such as in the MME 32. In particular, the query could additionally or alternatively inform the base stations of set 50 about the context data of user entity 10. On the other hand, performing the preemptive preparation of the handover as just described could also additionally involve sending a schedule 66 such as a copy of schedule 62 from base station 12 to core network 34 such as MME 32 within core network 34 so as to schedule a redirection of packets of one or more communication paths for communication sessions of the user entity 10 over the cellular network 24 and the user entity 10 so that the packets are distributed to each base station of set 64 depending on the respective temporal access interval 60 of the respective base station in set 64. In other words, MME 32 or the core network 34 would be able to plan, at an early stage; namely, at the time of receiving schedule 66, a distribution of inbound packets arriving, for instance, from the external network, to base stations among set 64 other than the base station via which the user entity 10 is currently connected to cellular network 24. Packets, for instance, which are likely to be buffered too long at a certain base station of set 64 and cannot be transmitted from that base station to the user entity 10 before the expected handover from that base station to the next base station of set 64, may be forwarded by core network 34 or MME 32, respectively, to the next base station of set 64 according to the sequence of expected times covered by the respective temporal access intervals 60. The cellular network 34 would, first, not have to wait for such redirection until the handover actually takes place on behalf of UE 10 actually using the one or more access parameters it has been provided with by way of schedule 62.

It should be noted that the cardinality of the set 50 and the cardinality of set 64 or the cardinality of either of these sets might be greater than 1. Generally, however, both may be 1, 2. As to the future start time 70 indicated in schedule 62 to indicate the start of the respective temporal access interval 60, it is noted that the same may be indicated by quantization indices or in seconds or the like.

It should have become clear from the above, that, if the prediction that formed the reason for the preemptive preparation of a handover is good, the UE 10 is likely to handover from base station 12 to the target base station for which the temporally-nearest temporal access interval 60 is indicated in schedule 62. That is, UE 10 will use the one or more access parameter 66 for this target base station which would, in the example illustrated in FIG. 4, for instance, be the base station $14_a$, during temporal access interval 60 and thus, would perform or activate the handover preemptively prepared as described so far. This base station $14_a$ would then inform base station 12 about the user entity having accessed the cellular network 24 via the base station $14_a$ and triggered by this information, base station 12 would cut its connection to UE 10, while core network 34 would be informed by base station 14$_a$ with, triggered thereby, redirecting a cellular network internal sub-path of each of a set of one or more communication paths of one or more communication sessions running via the cellular network 24 and the user entity 10, from base station 12 to base station 14$_a$. Further, resources of the base station 11 via which the user entity 10 is currently or, better, has been so far, connected to the cellular network, here base station 12, could be released such as one or more buffers thereof managed by the base station for the one or more currently active communication sessions of UE 10. Base station 12 could cut its connection to UE 10 and/or release its resources alternatively in response to a signal sent from the core network indicating that the path redirection has been performed responsive, in turn, to the note sent from target base station 14$_a$, which then assumes the now role as source base station. In the same manner, the next handover between this target base station, which is now the source base station, to the next target base station of set 64 takes place.

Thus, with respect to FIG. 4, a cellular network 24 has been described which supports a preemptive preparation of a handover for user entity 10. Concurrently, however, the above description revealed a user entity 10 for communication over a cellular network 24, wherein the user entity 10 is configured to gain information on a predicted future route 52 of the user entity and inform the cellular network on the predicted future route 52. The UE could transmit a list or vector of coordinates, e.g. WGS84 coordinates, to the cellular infrastructure 24. UE 10 could do this upon request from the base station 12, from a V2X server or in regular time intervals. It should be noted, however, as described above, the origin of the information on the predicted future route 52 may stem from an entity other than the user entity 10. The information on the predicted future route 52 may be sent to cellular network 24, for instance, as a set of pairs of time and coordinates of locations at which the user entity 10 is on the predicted future route 52, or a sequence of coordinates of location sequentially traversed by the user entity along the predicted future route 52 such as locations which the user entity traverses along the predicted future route 52 at a certain temporal pitch of a constant pitch interval.

Further, however, the above description revealed the description of a user entity for communication over a cellular network 24, wherein the user entity 10 is configured to manage a set of one or more preemptively prepared handovers. In this way, the user entity 10 not necessarily informs the cellular network on the predicted future route 52. In general, the user entity 10 could handover to more than one carrier. The user entity could, thus, perform the handover within the frame work of dual connectivity, e.g. LTE+NR/5G, multi-RAT e.g. separate networks LTE, CDMA/UMTS, NR or carrier aggregation, e.g. handover to a carrier with lower frequency=better coverage or higher frequency=potential higher capacity or lower latency. Details and background in this respect are outlined below. In any case, the user entity 10 may be able to manage a set of one or more preemptively prepared handovers; namely, those indicated in schedule 62 which user entity 10 receives from the cellular network 24 and the source base station 12, respectively. From the reception onwards, i.e., substantially over the whole time interval 54, the user entity 10 continuously checks whether the schedule 62 becomes inadequate. For instance, the user entity recognizes that the user entity gets farther away from the predicted future route 52 because, for instance, the user of the user entity 10 decided to take another way than rule 52. In that case, user entity could inform the cellular network 24 on the inadequateness so that, for instance, cellular network 24 could inform the target base stations of set 64 thereabout so that the latter could render the reserved radio access resources associated with the one or more access parameters available for other user entities. As described above, the user entity could derive from the schedule 62 the temporal access interval 60 plus associated one or more access parameter 66 per target base station within set 64 and then, from the reception of schedule 62 onwards, continuously decide on accessing the cellular network 24 via any of this set 64 of target base stations; namely, any base station of the set 64 within a reach of which the user entity 10 currently is. Obviously, this decision is merely available during the temporal access interval 60 associated with a respective target base station, annually using the one or more access parameters specified in the schedule. The user entity 10 is able to perform a handover or access of the cellular network using schedule 62, or perform the just described continuous decision thereabout, without obtaining current permissions from the cellular network 24 on a case by case basis, i.e., without obtaining current permission during time interval 54. Schedule 52, instead, serves as a license for user entity to perform each handover during the respective time interval 60.

As described later on in more detail, user entity 10 may be configured to perform the management of the set of one or more preemptively prepared handovers as outlined in schedule 62 with respect to one or more wireless connections to the cellular network 24 of a set of current wireless connections to the cellular network 24. For instance, user entity 10 could use aggregated carriers and perform the exploitation of preemptively prepared handovers with respect to one or more than one component carrier of such aggregated carriers.

As should have become clear from the above, the user entity may be able to resume connectivity to the cellular network after loss of the connectivity using any of the set of one or more preemptively prepared handovers despite a temporary loss of connection. For example, in a scenario where the UE lost connection due to a tunnel, UE 10 and the next base station involved in the preemptive preparation of HOs may simply resume the connection between using the preemptively prepared HO.

Although not described above so far, it should be noted that in addition to the description brought forward above with respect to FIG. 4, or alternatively thereto, a cellular network could be configured to follow a third aspect of the present application. In particular, the cellular network could analyze a predetermined set of cells 15 of base stations around the position of the user entity with respect to a set of possible routes leading away from the user entity's position to determine a favorite route among the set of possible routes in terms of connectivity to the user entity. For instance, a cellular network could query the set 50 of target base stations with the set 50, however, covering more than one route, i.e., a set of possible routes leading away from the current user entity's position. The target base stations of set 50 would, thus, be determined to cover all routes in the set of possible routes. The target base stations of set 50 would answer the query and based on these answers, cellular network 24 could determine a favorite route out of all routes in the set of possible routes in terms of connectivity; namely, the route alongside of which, for instance, all nearest base stations indicated a possible access time interval 60 plus associated one or more access parameters 66. For example, the favorite route could be the Best Connected Route from point-of-view of the user terminal UE, such as the route providing highest QoS. The favorite route could be the Best Connected Route from base station point-of-view such as the route with the least traffic or highest capacity/coverage/lowest delay/best user experience/low overload likelihood. The cellular network 24 could inform the user entity 10 about the favorite route actively or upon request or polling by the UE 10. For instance, currently serving base station 12 could provide a download link, so that the UE 10 or its user can decide itself to update its route. In other words, base station 12 or cellular network 24 could push this information to the UE. Alternatively, the UE 10 could download or pull this information on the favorite route from the cellular network 24. Applications running on the user entity, for instance, could use this information. By this measure, the user of a user entity, for instance, could be provided with this information such as, for instance, via a display or a similar output device of the UE 10, and the user could decide, as the bearer of the user entity 10, to take the favorite route in order to, for instance, enjoy a currently downloaded video without any stall event. The "user" should be, however, not be restricted to a human user. Imagine the UE to form an interface of a robot or other autonomous driving device where an interruption of the data connection could have tremendously negative and dangerous impacts. Likewise, the recipient of a path recommendation could be another device such as device responsible for, or cooperating in, determining the future route which the UE takes such as a traffic management unit. The information about the possible routes could be provided by the cellular network from outside. However, the cellular network could determine the set of possible routes by itself or could receive this information on the set of possible routes from the user entity. That is, the cellular infrastructure 24 could recommend certain routes based on the coverage, e.g. by indicating to the user, which route index provides the best coverage, e.g. top-m routes from the network point-of-view. Analysis and information provision could be performed within the source base station 12. That is, any base station 11 could have this functionality. The functionality could, however, by realized in other device of the cellular network 24.

The above embodiments could be used to achieve lower handover latency and/or lower control signal overhead associated with handovers.

Current LTE Handover (HO) procedures have not been designed to accommodate Ultra Reliable Low Latency Communications (URLLC) where the existing average minimum HO is approximately between 40-50 ms [1]. As a result, there is room to improve the efficiency of the overall HO process for 5G use cases, including low latency communications. This may be done by using the embodiments described so far.

Figure 6:
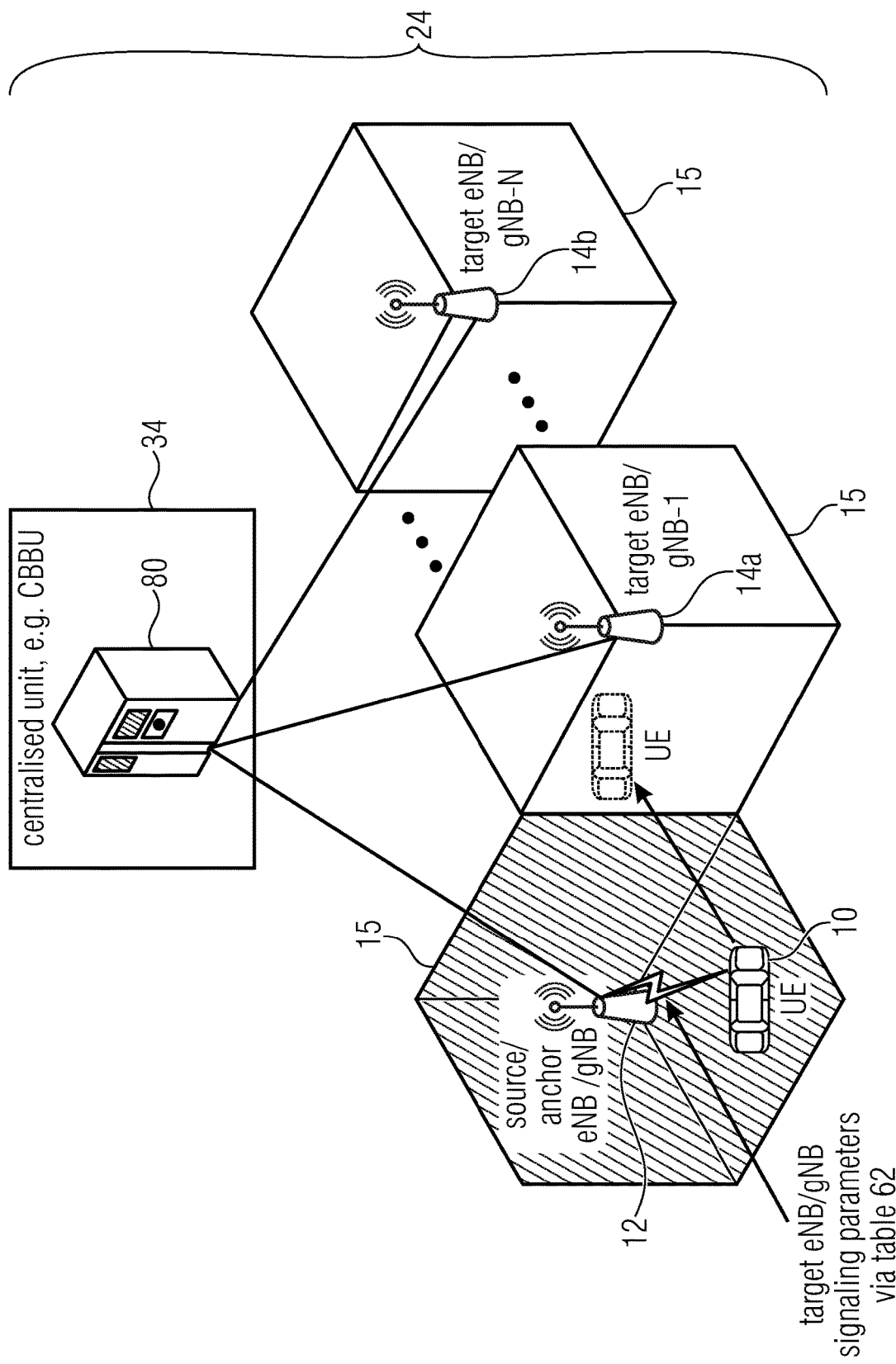
FIG. 6 shows a schematic block diagram illustrating a cellular network, a UE and signaling used in order to realize a preemptive handover preparation in an LTE framework.

An efficient and rapid mechanism for performing handovers through predictive route information of the UE with varying mobility speeds may be achieved using above embodiments. The advantage of the latter enables reduced signaling overhead and latency when connecting to the subsequent target eNB(s)/gNB(s) for LTE and New Radio (NR) network architectures. This may be performed by UE signaling the pre-allocated target cell parameters 66 used to connect to the target eNB/gNB before the actual HO process. FIG. 6 provides an overview of a Predictive-HO (P-HO) scheme in the LTE framework.

A preemptive decision will have to be triggered before the actual HO occurs in order for the Source/Anchor eNB/gNB 12 to signal the UE 10 with the target eNB/gNB parameters 66 (e.g. RRCConnectionReconfiguration including the mobilityControlInfo message), examples of which are outlined in the table shown in FIG. 7.

In even other words, the embodiments described so far enable an efficient mechanism for predictive handovers in a NR network with N predicted target gNBs.

The following aspects may be supported (cp. FIG. 4 and FIG. 6):

1) Initiate a HO preparation to N-target eNBs 64 along a predicted path 52 and UE pre-allocated signaling using triggers initiated by the:
   a. the source gNB or anchor gNB 12 (Network Controlled),
   b. UE 10 triggered,
   c. a novel centralized entity 80 in the radio access network 24, e.g. central baseband unit (CBBU) with a central Radio Resource Management (RRM) (Network Controlled).

2) Efficient N-hop predictive context forwarding using network signaling sent from
   a. a source or anchor-gNB 12 to N target-gNBs 64,
   b. an anchor gNB 12 within a RAN paging/tracking/notification area such as 40 to N new or potentially new anchor eNB within a new RAN paging/tracking/notification area,
   c. a central baseband unit 80 and/or to N new or potentially new central baseband units,
   d. a source gNB 12 or CBBU 80 to the UE 10 in preparation of a HO process.

In particular, the NW or UE 10 can trigger the initiation of a N-hop Predictive Handover (P-HO), according to the RRC State. The P-HO procedure is a set of configuration parameters 64 of a set 64 of target cells along a predicted route 59 that are signaled to a UE 10, before a HO actually takes place. The UE 10 can, with the aid of certain available side information (CAM Messages containing time, 2D and 3D location reporting, location vectors, location coordinate intervals, journey route, flight plan etc.) trigger the source/anchor eNB 12 to perform a P-HO. Two options are considered for driving the P-HO:

1. In RRC Connected (LTE)/Active (NR) Mode: The source/anchor eNB 12 or the CBBU 80 in case of CU/DU (central unit/distributed unit) split) initiates and performs the P-HO.
2. In Lightly Connected (LTE)/Inactive (NR) Mode: The UE 10 autonomously initiates the request for the relevant P-HO configuration parameters including the predictive context forwarding to all relevant target eNBs/gNBs.

Therefore, the source eNB or centralized entities (e.g., CRRM, CBBU, MME) can initiate the multiple predictive HO preparation for N≥1 target eNBs 64 along the predicted UE trajectory 52. This scheme avoids the need to re-initiate the HO preparation phase once the UE passes through each of the expected target cells since all the used resources have been pre-allocated. The resulting P-HO scheme aims to reduce signaling overhead and latency, once information about the predicted route 52 has been established. The N expected target eNBs 64 will expect the UE 10 to reach its cell within a pre-defined interval 60 (valid time interval) based on the initial setup time $t_0$ of the N-hop predictive HO procedure and a UE mobility type (e.g. high or low speed). If the UE 10 abruptly changes trajectory or remains stationary at a particular target cell, then all target eNBs/gNBs 64 identified during the P-HO procedure can release the pre-allocated resources via a timeout.

Figure 8:
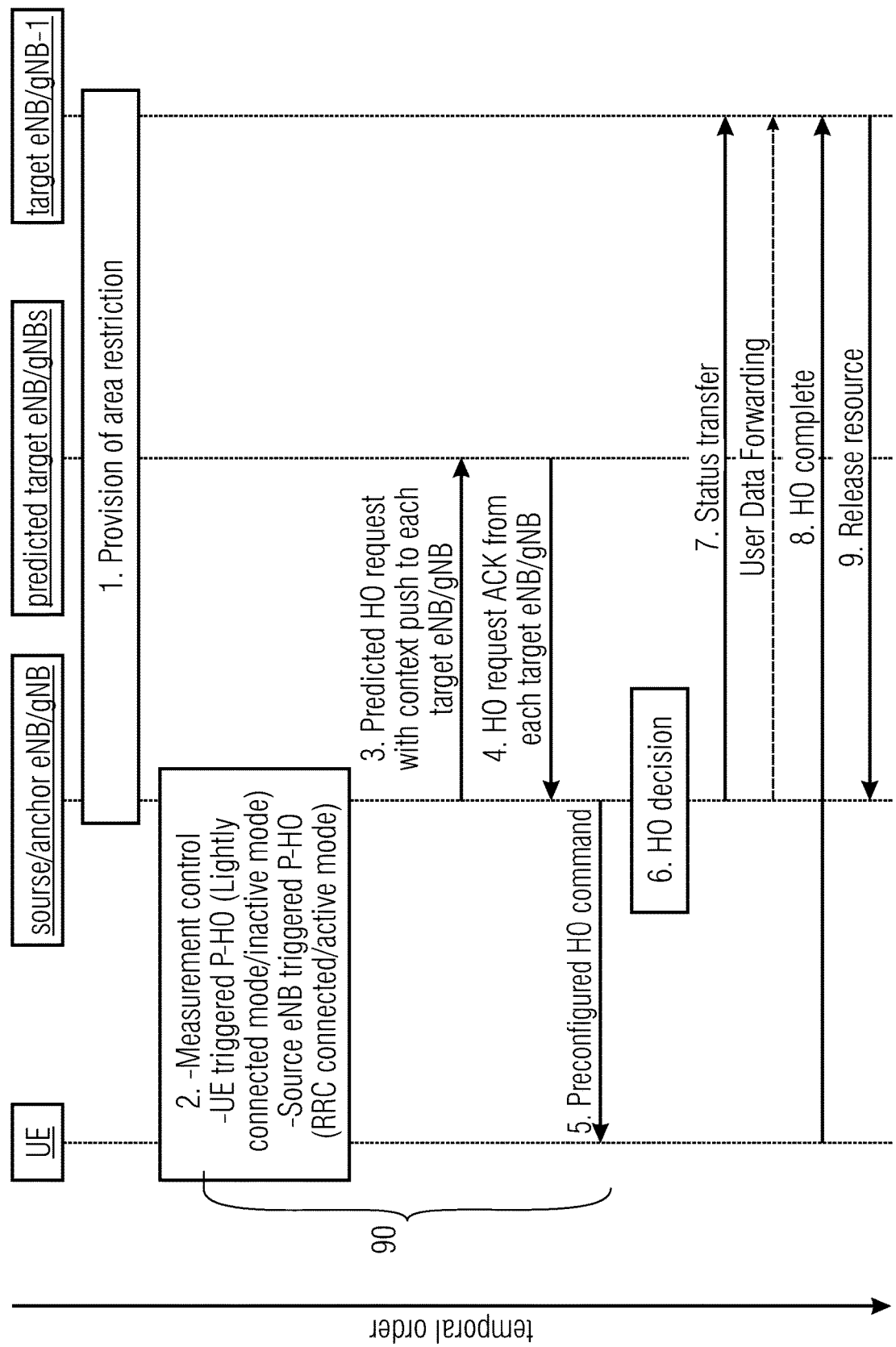
FIG. 8 shows a sequence of steps involved in a preemptively prepared handover in a manner similar to the illustration used in FIGS. 2 and 3, in accordance with an embodiment of the present application.

An example sequence diagram for a NW or UE driven P-HO is shown in the sequence chart in FIG. 8. The embraced portion 90 indicates the signaling scheme specific for the P-HO scenario. The P-HO procedure is triggered by the centralized entities such as 80 or source eNB/gNB 12 when the UE 10 is either in the proposed active (NR) and normal RRC connected states (LTE) as shown in the state diagram (FIG. 3) [3]. When the UE 10 is in the lightly connected mode, prediction information based on the P-HO can enable the UE to autonomously transition between eNB/gNBs cells belonging to different paging areas as described farther below. In order to perform the used RRC Reconfiguration between each cell, the UE can transition from a normally connected state to a lightly connected state. As a result, the UE can be in a low power lightly connected state and still perform the P-HO.

Messaging Step Overview of FIG. 8

Message 2: This trigger can be initiated in the source eNB (or centralized unit) when the UE is in RRC connected/Active mode (in which there is no additional message. Alternatively, the P-HO can be triggered by the UE autonomously in lightly connected/inactive mode as part of the measurement report.

Message 3: This is a distributed message by the source eNB/gNB requesting the availability of resources from each target eNB/gNB (multiple HO preparation) together with the UE context to be transferred.

Message 4: Container with ACKs from respective target eNBs/gNBs with available resources.

Message 5: UE message with the used signaling parameters for the target eNBs/gNBs.

Figure 9:
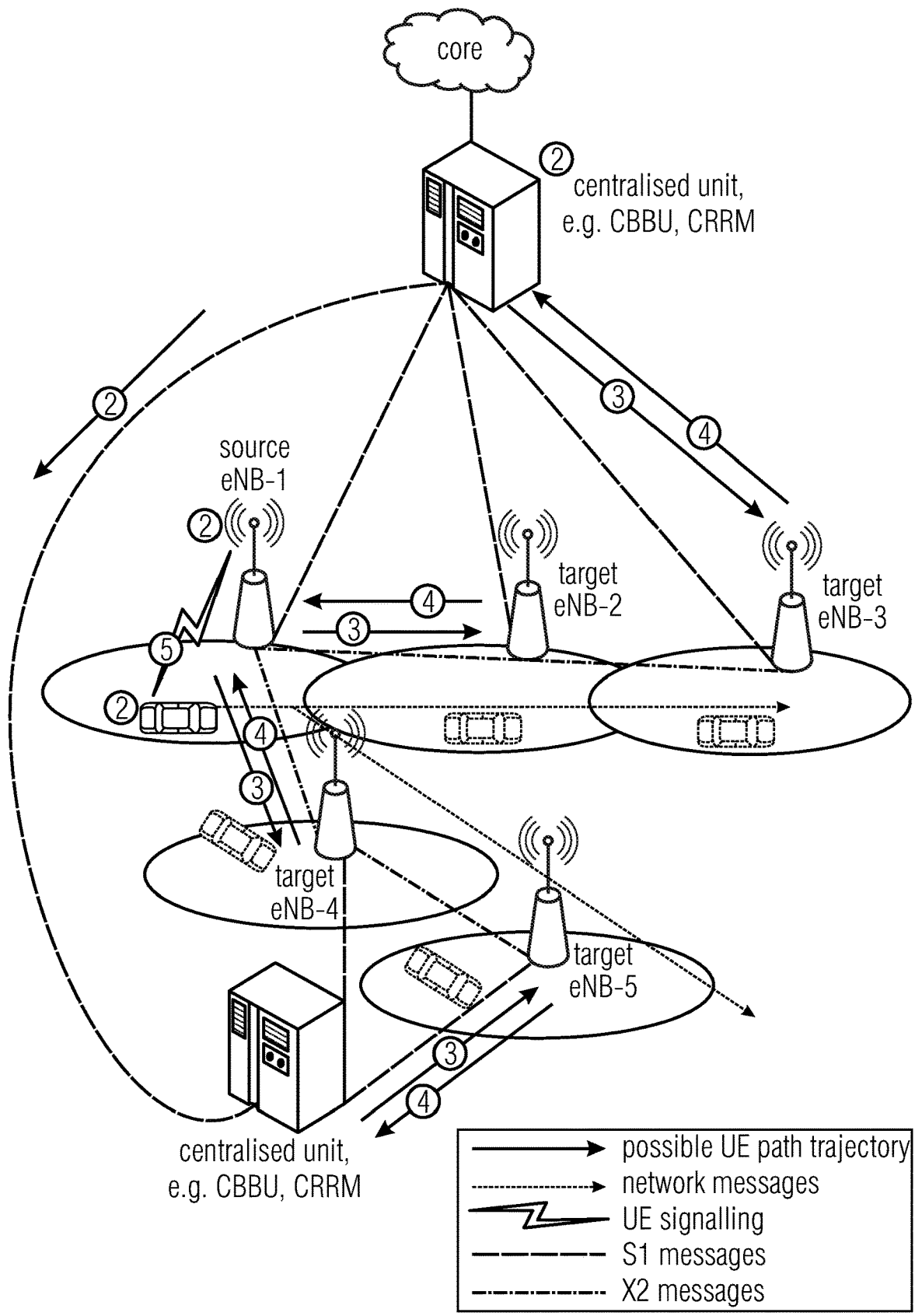
FIG. 9 shows a schematic block diagram of a predictive handover (P-HO) architecture and message flow overview in accordance with an embodiment.

FIG. 9 is a further illustration of the aforementioned messages using a Centralized Unit/Distributed NR Architecture. The signaling flows of the messages correspond to the proposed messages in FIG. 8.

Key Procedures of the P-HO:

A more detailed exemplary message description is presented below:

Message 2: The Source eNB/centralized unit or UE can trigger the P-HO process. From the source eNB/centralized unit perspective the trigger can occur by monitoring the UE when in connected mode and then executing a P-HO. In relation to the UE, information about the predicted route can be directed by the UE itself, enabling it to autonomously move between paging areas in lightly connected mode using the onboard prediction data. The UE can signal the following messages to the source eNB within the measurement report:

CAM messages,

Speed, acceleration, velocity, 2D and 3D location reporting, etc.

Route information, GPS information, flight plan

Traffic information, etc.

Example Syntax: UE-Aided-P-HO-IE

| IE/Group Name | Description |
| --- | --- |
| Message Type [4] | "Identifies the message being transmitted, e.g. Handover Resource Allocation, Path Switch Request" [12] |
| CAM-Aided-Route-Prediction | The list of data elements in [14] Annex A, e.g. Acceleration Control, CourseofJourney, Reference Position |
| Path-target-eNB-ID-List | If available the positions or ID of target eNBs along the predicted route |
| RRC-Connect-Time | RRC connect period of current cell |
| RouteInfo/FlightPlanInfo | 2D and 3D location vector of UE, UE Direction, course location points along a UE route |

Message 3: The P-HO request message via S1/X2 requests resource availability from potential target eNB/gNBs about a predicted handover from a specific UE. It can contain information about the user such as expected arrival time, unique IDs, context and security information and expected level of service requirements. Additionally, the context of the UE can be pushed to all target eNBs. An example of this setup S1 message could include: P-HO-REQUEST-IE (Direction: source eNBs→Target eNBs)

| IE/Group Name | Description |
| --- | --- |
| Message Type [4] | Identifies the message being transmitted, e.g. Handover Resource Allocation, Path Switch Request |
| Handover Type[4] | Indicates the type of Handover at the source eNB, e.g. IntraLTE, LTEtoUTRAN |
| eNB List to be setup | Identifies a list of target eNBs |
| MME-UE-S1-AP-ID[4] | "Uniquely identifies the UE association over the S1 interface within the MME." [12] |
| eNB UE S1AP ID [4] | "Uniquely identifies the UE association over the S1 interface within the eNB." [12] |
| Predicted UE Behavior | Defines the future behavior of the UE with predictable activity with predicted info, to assist future eNBs in determining the optimum RRC connection time. |
| UE Context Transfer | The UE context is pushed to all Target nodes based on the prediction. |
| UE Mobility Type | Low, Medium, High speed |

Message 4: The response from the target eNB can acknowledge or deny the request via S1/X2 to the requesting source eNB/centralized unit using a ACK/NACK message. The decision is based on the outcome of the admission control and availability of resources. Once the target eNB acknowledges the request it has prepared resources for the potential new UE, has stored the new context and configured the lower layer protocols. An example of such a message from each target eNB is given as:

P-HO-REQUEST-ACK-IE (Direction: Target eNBs→source eNB/Centralized Unit)

| IE/Group Name | Description |
| --- | --- |
| Message Type [4] | "Identifies the message being transmitted, e.g. Handover Resource Allocation, Path Switch Request" [12] |
| eRABs-Admitted-List [4] | "HO Request ACK message is sent by the Target eNB to inform the MME about the prepared resources of the Target such as E-RABs Admitted List. Hence the E-RABs those could be admitted in the target are refered as E-RABs Admitted List." [12]. |
| MME-UE-S1-AP-ID [4] | "Uniquely identifies the UE association over the S1 interface within the MME." [12] |
| eNB UE S1AP ID [4] | "Uniquely identifies the UE association over the S1 interface within the eNB."[12] |

Message 5: The table shown in FIG. 7 is a summary of the used UE signaling parameters that would be sent over the air to the UE originating from the eNB/gNB. The security keys of the target cells would use an additional layer of encryption, if they are to be pre-allocated. The RNTI and RACH Preambles can be pre-allocated according to the mobility type, thus eliminating the need for the UE to acquire these parameters each time when transitioning between the target cells. The UE could keep its identity across several cells, depending on whether the UE is in high mobility. One approach could be that the UE has a single ID within the RAN paging/notification area (e.g. selected by the anchor eNB where the UE entered the RAN paging/notification area or selected by a central node e.g. CRRM, CBBU, MME) denoted by the Unique-UE-ID element. The RAN (source eNB/centralized unit) may differentiate between three mobility types (e.g. low, medium and high mobility). Low and medium mobility types would get a cell specific C-RNTI, while the high mobility types of UEs can keep their identities. The target eNB would then know which UE ID to lookup, from the UE context already received in message 3. The SL configuration can also be pre-allocated to enable V2V communications. If the request is granted and the handover is prepared this message includes parameters used for the UE connect to Target eNBs.

The timeout indicator would be set at the source eNB depending on whether the P-HO was NW or UE triggered, and shared with the multiple target eNBs. The UE can notify the target eNBs via uplink signaling and if the UE does not enter the cells of the target eNBs within the time used, the pre-allocated resources are released and the fallback would be the traditional HO procedure. A common RACH preamble management and/or common RACH resource management within the RAN paging/notification area would be envisioned. A high mobility UE would transition rapidly from one eNB to another and therefore may use the same preamble, across multiple target eNBs. It would then entail the notion of a common RACH resource pools across eNBs in order for the same RACH signal to be sent to multiple target eNBs along the route. Multiple target eNBs might then be able to decode the signal, which entails the formation of a common RACH resource pool. This highly depends on the RACH load and the RACH resource reuse. Since multiple cells share resources it might need to be operated at lower load decreasing efficiencies due to lower resource reuse.

Figure 10:
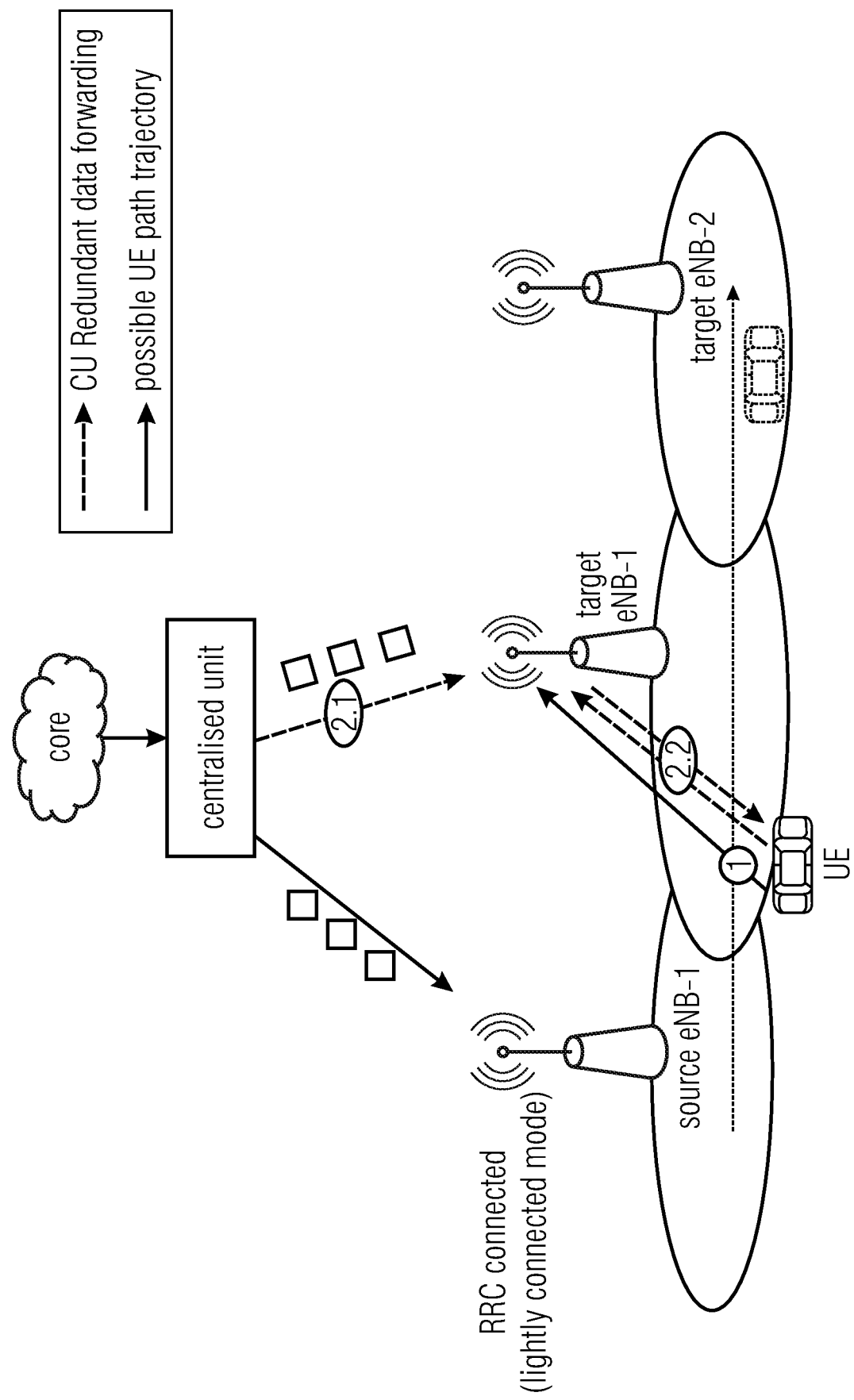
FIG. 10 shows a schematic block diagram illustrating an example for an out-of-coverage HO process.

P-HO User Data Forwarding, in case of out-of-coverage scenario may be done as follows: In the event that the UE loses coverage and has a Radio Link Failure (RLF) during the P-HO process with source eNB-1, we have the out-of-coverage scenario shown in FIG. 10. The UE attempts an RRC connection re-establishment to the target eNB given that it has already acquired the signaling parameters to connect with the target eNB. Redundant data forwarding could be applied to a centralized unit architecture.

Step/Description 1: RRC connection re-establishment: Enabling synchronization and timing advance using the prediction information already at the UE. This procedure can be initiated with the prepared RACH preambles and C-RNTI.

Step/Description 2.1: Prior to timeout with the source eNB, the core network has already forwarded redundant data via the centralized unit to the next target eNB based on information from the predictive HO procedure. This redundant data is forwarded to the target eNB, subject to the initiation of the P-HO process.

| IE/Group Name | Description |
| --- | --- |
| Message Type [4] | "Identifies the message being transmitted, e.g. Handover Resource Allocation, Path Switch Request" [12] |
| X2 TNL Configuration Info [4] | Contains the P-HO related information. |
| Core Data Forwarding | Forwards the redundant data as initially transmitted to the source eNB. |
| MME-UE-S1-AP-ID-SeNB | "Uniquely identifies the UE association over the S1 interface within the MME." [12] |

Step/Description 2.2: The UE can transmit a last packet ACK sequence number to the target eNB, to resume data forwarding from the last known timeout of the RRC connection with the SeNB.

| IE/Group Name | Description |
| --- | --- |
| Message Type [4] | "Identifies the message being transmitted, e.g. Handover Resource Allocation, Path Switch Request" [12] |
| X2 TNL Configuration Info [4] | Contains the P-HO related information. |
| UE Data Forwarding | Sends ACK and forwards the SN number. |

In Dual-connectivity mode UE P-HO could be used as well.

Dual-connected (DC) P-HOs enable URLLC services of mobile UEs and therefore can fulfill the high reliability requirement. Predicted UE route information can also aid in seamless handover of UEs, which are in dual-connectivity mode, i.e. simultaneously connected to two eNBs, the master eNB and secondary eNB. This is particularly applicable to scenarios where a mobile UE travels across a number of small cells within a macro cell environment, e.g. dense urban scenario. A group of such small cells belong to a secondary cell group (SCG). DC enabled HOs can result in zero interruption due to the availability of at least one connected link at all times. The novel claim consists of the way Dual-connectivity can be initially leveraged to enable the master eNB to perform the P-HO for multiple small cells (secondary eNBs) allowing the UE to move across the small cells in a seamless fashion reducing overhead in standard HO signaling as described in E1. The procedure is as follows:

1. The master eNB initiates the P-HO process (according to the source driven P-HO procedure) by receiving the SCG information which includes the parameters in Table 1 for each small cell.
2. The master eNB then provides this information to the UE (via a RRC Reconfiguration message) with all the used P-HO information for each small cell along the predicted route (See Table 1).
3. The master eNB can then terminate dual-connectivity, allowing the UE to have a single Uu connection with each small along the predicted route with the advantage that the HO has already been prepared, allowing a RRC Reconfiguration with each small cell in a seamless fashion.

The following description now attends to a description of the second aspect of the present application which pertains to the handling of user entities in a non-active mode in an efficient manner by the usage of a so-called "tracking/paging area". Again, the description of this aspect and embodiments thereof starts with a type of presentation or overview so that the underlying problem with non-active UEs is clear and the advantages resulting from the embodiments described later on. The following overview is, however, partially also an extension of the introductory portion with respect to the description and presentation of the embodiments concerning the first and third aspects of the present application described above.

Mobility enhancements in lightly connected or inactive mode were recently developed. The state machine in current control plane protocols in cellular wireless mainly support two modes: the idle mode and the connected mode. In the idle mode, the UE monitors the control channel (PCH) according to a discontinuous reception (DRX) cycle. While in the idle state, the MME is responsible for the monitoring the UE. In the connected mode, the UE is connected to a known cell and can perform data transfer to and from the device. While in the connected mode/active state, the corresponding eNB is responsible for monitoring the UE.

Figure 11:
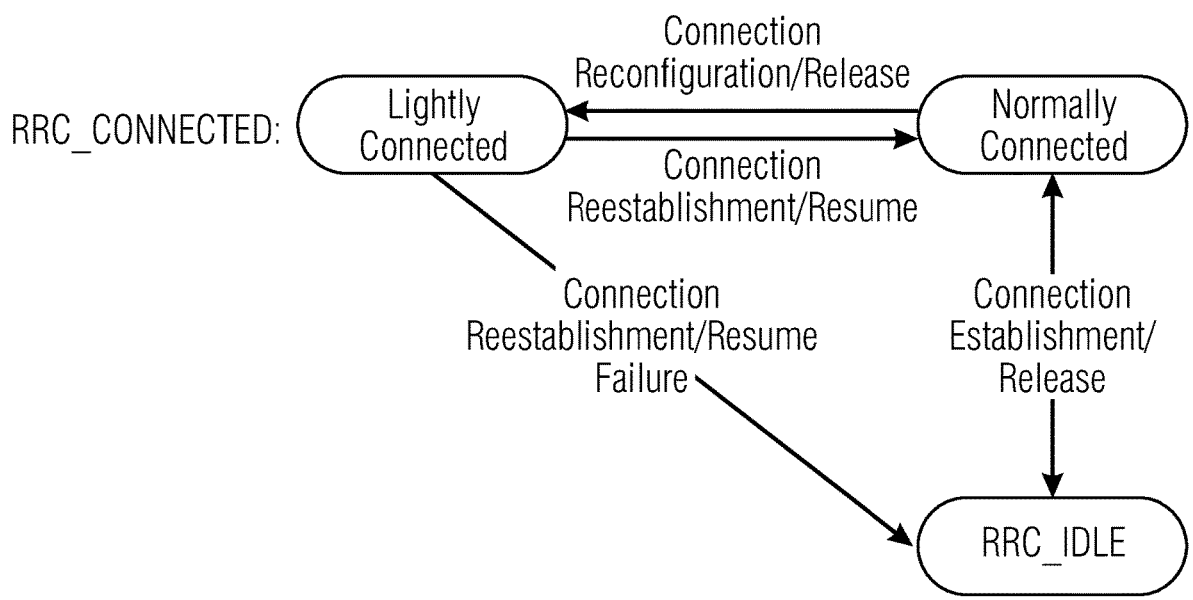
FIG. 11 shows a schematic diagram illustrating the state machine of connection modes discussed in RAN2 for reduced signaling traffic wherein reference is made to R2-168345 [3]
Figure 12:
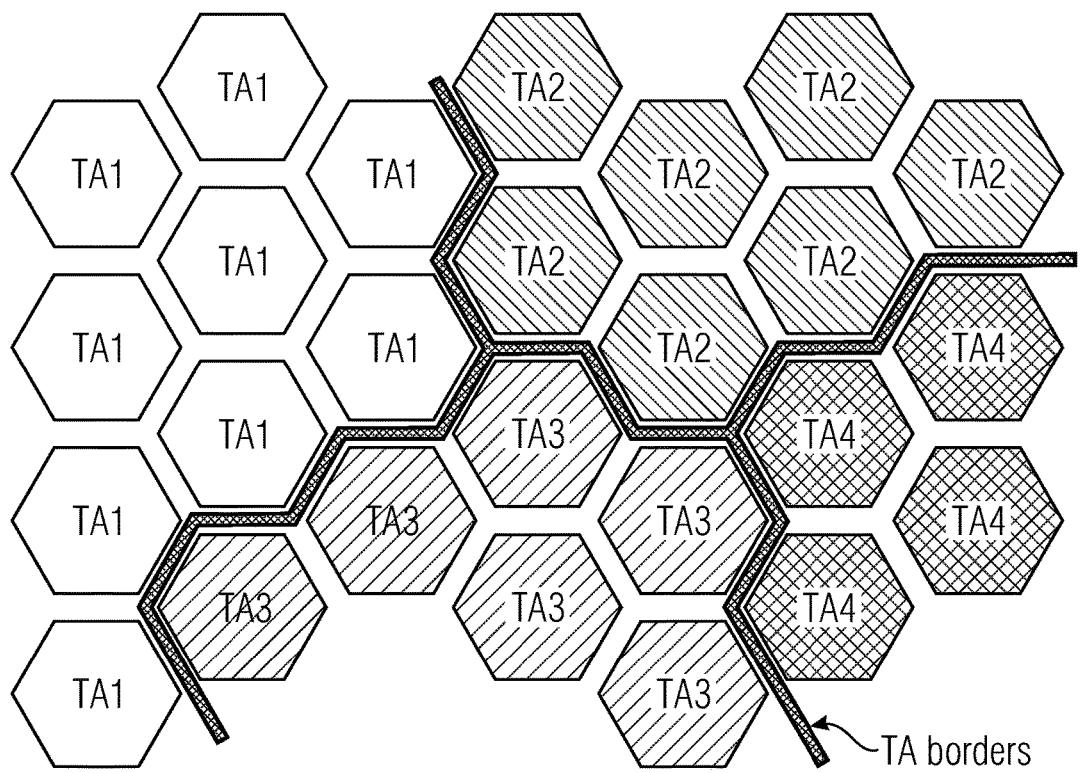
FIG. 12 shows a schematic diagram illustrating clusters of base station cells to tracking areas separated by tracking/paging area borders known from, for instance, [11]; in other words, non-access stratum (NAS) as depicted in FIG. 12.

HOs are performed when the UE is in the RRC connected mode. Currently in discussion is the introduction of a new mode, which is referred to as lightly connected (in LTE) or as inactive state (in 5G new radio (NR)), which should increase signaling efficiency, also for new services. In this state, the UE is responsible for transferring into idle or connected states. The lightly connected UEs enter into legacy behavior in RRC connected via RRC procedure including three messages (i.e. request, response and complete). In the lightly connected state, the S1 connection for this UE is kept and active, and a new signaling scheme from the UE could be introduced, in order to optimize handovers and improve network performance though movement predictions. FIG. 11 is an example of the lightly connected state mode of operation as proposed in [3].

RAN Paging/Notification Area and Tracking Area is used to track non-active UEs. Paging is used for network-initiated connection setup when the UE is in the idle state (RRC_IDLE), see [5]. This shall indicate to the UE to start a service request. Since the location of the device is typically not known on a cell level, the paging message is typically transmitted across multiple cells in the so-called tracking area. These tracking areas are controlled by the MME. The UE informs the network via tracking area updates (TAU) of its location with the network. To reduce signaling traffic, a UE does not need to initiates a TAU if it enters a tracking area which is included in its tracking area list (TAL). See FIG. 2.

Figure 13:
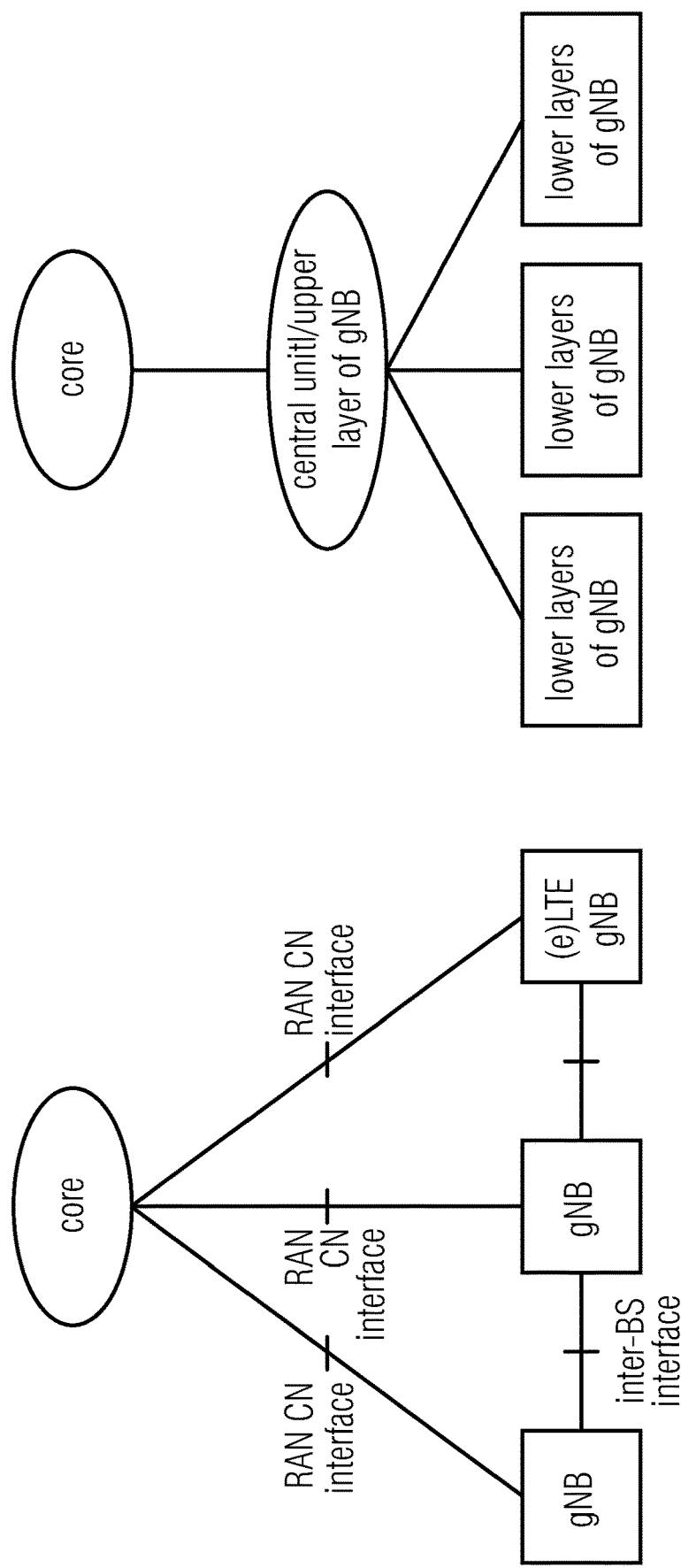
FIG. 13 shows a block diagram of a RN architecture according to [7]

As to NR Architecture, two proposed architecture types for NR are proposed, viz. Centralized Unit (CU) Architecture or Distributed Unit (DU) Architecture as shown in FIG. 13.

Regarding V2X System Architecture, one of the main modes of operation in V2X consists of the broadcast architecture and serves as example application of the proposed P-HO scheme.

Figure 14:
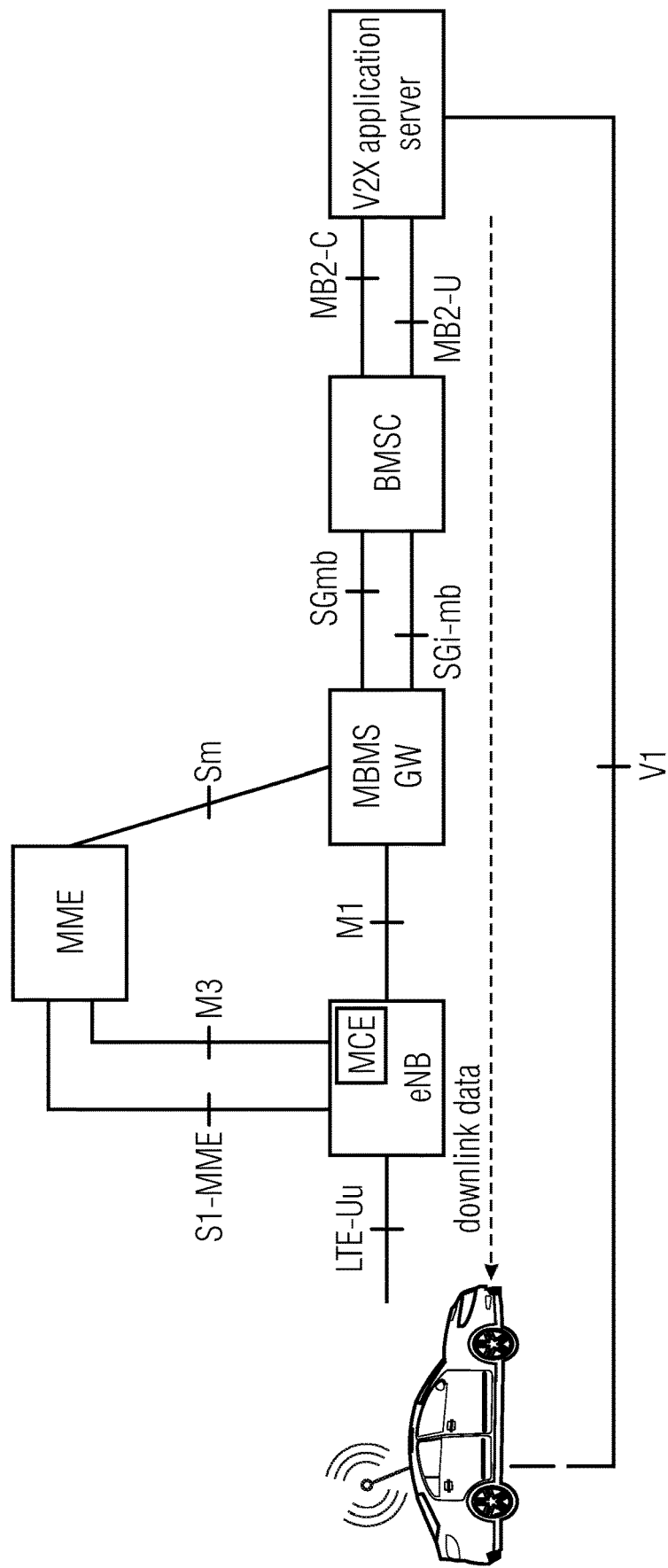
FIG. 14 shows a block diagram of a V2X broadcast architecture according to [8] as an example where embodiments of the present application might advantageously be used.

As to Broadcast V2X Architecture, the high-level V2X broadcast architecture is shown in FIG. 14 with a new additional entity known as the V2X application server [8].

The core functionality V2X Application Server is out of scope of 3GPP [8], and an overview of the role of the Application server has been defined by the ITS. According to the definition in [8], the Application server aggregates inputs from several sources including the vehicles on the road, road side units as well as external information from various other network entities. The Application Server then correlates this information based on time, location and incident to develop a better idea regarding the state of traffic. Once the information has been consolidated and processed it then has to decide in which information it has to disseminate to other vehicles in a geographic area [9]. Currently the V2X application server has the following specifications according to 3GPP, which fall in line with ETSI's proposal [8]:

Ability to receive uplink data from the UE over unicast.
Delivering data to the UE(s) in a target area using Unicast Delivery and/or MBMS Delivery.
Mapping from geographic location information to appropriate target MBMS Service Area ID (SAI(s)) for the broadcast.
Mapping from geographic location information to appropriate target 3GPP E-UTRAN Cell Global Identifier (ECGI(s)) for the broadcast.
Pre-configured with Local MBMS (L.MBMS) information (e.g. IP multicast address, multicast source (SSM), C-TEID).
Pre-configured with L.MBMS's IP address and port number for the user-plane.

Figure 15:
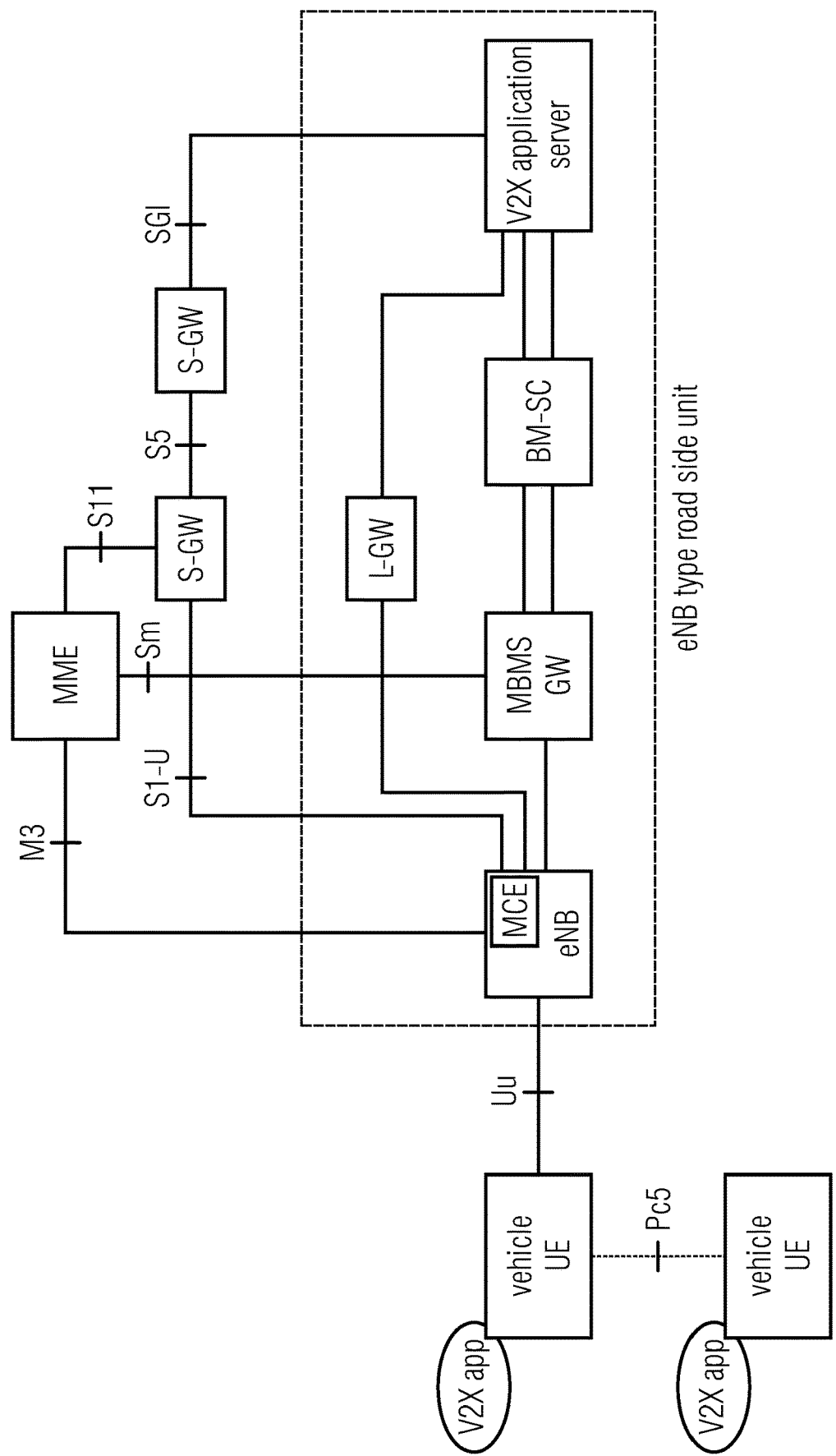
FIG. 15 shows a block diagram of a V2X eNB type roadside unit developed at the edge as an example of how a prediction of an HO process may be made faster.

In order to minimize delays between RAN and V2X infrastructure, the V2X entities can be grouped into a eNB type Road Side Unit (RSU). This RSU can be deployed directly at a eNB, similar to edge-cloud computing, e.g. via local IP breakout interface (LIPA). This enables faster prediction of the HO process. See FIG. 15.

Dual-connectivity (DC) was included as part of small cell enhancements in LTE and offers several advantages which include [10]:

Increased UE throughput at the cell edge,
Increase in robustness for UE mobility,
Reduction in signaling overhead toward the core due to frequent HO.

Figure 16:
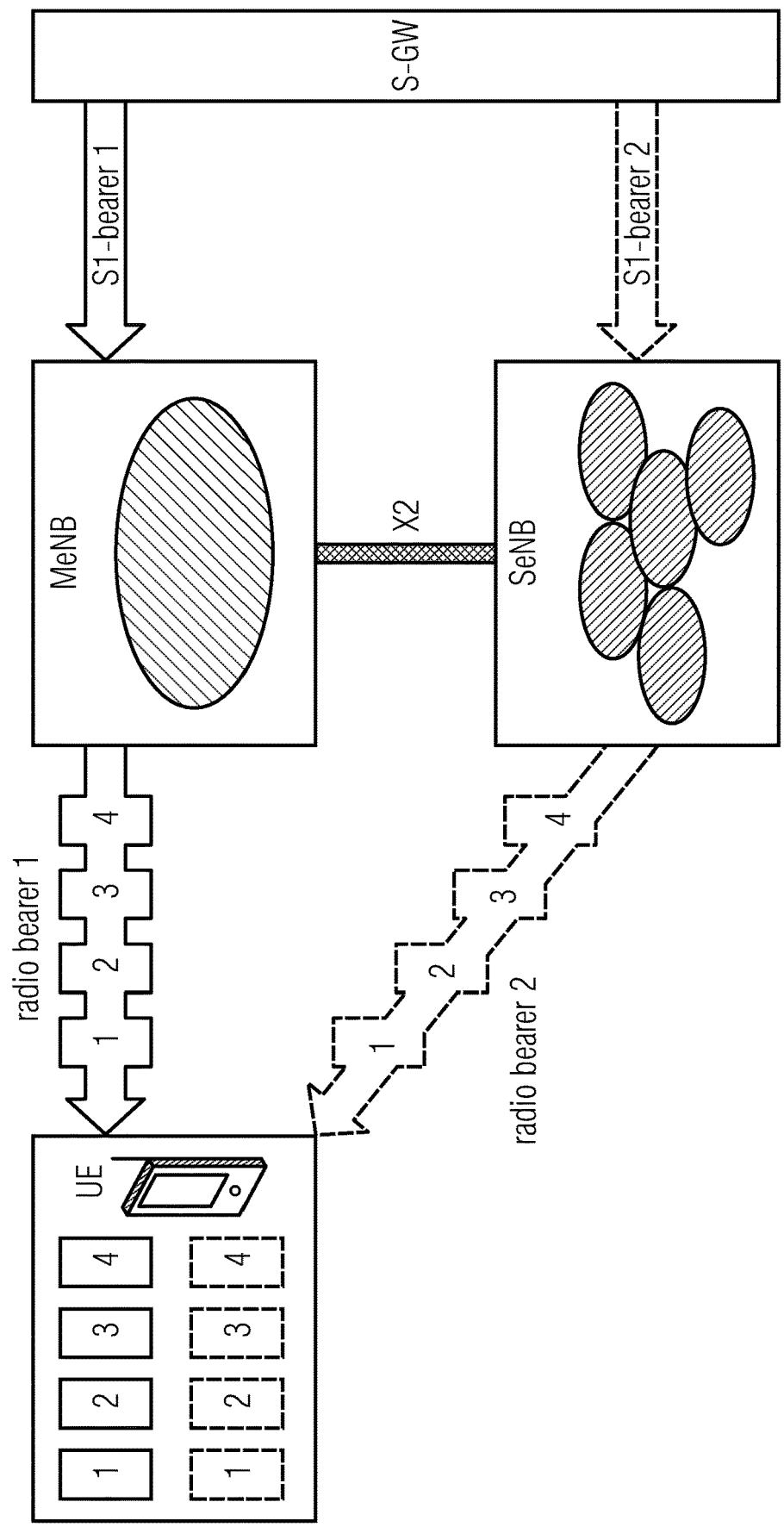
FIG. 16 shows a schematic diagram illustrating a data split at the bearer level according to [11]
Figure 17:
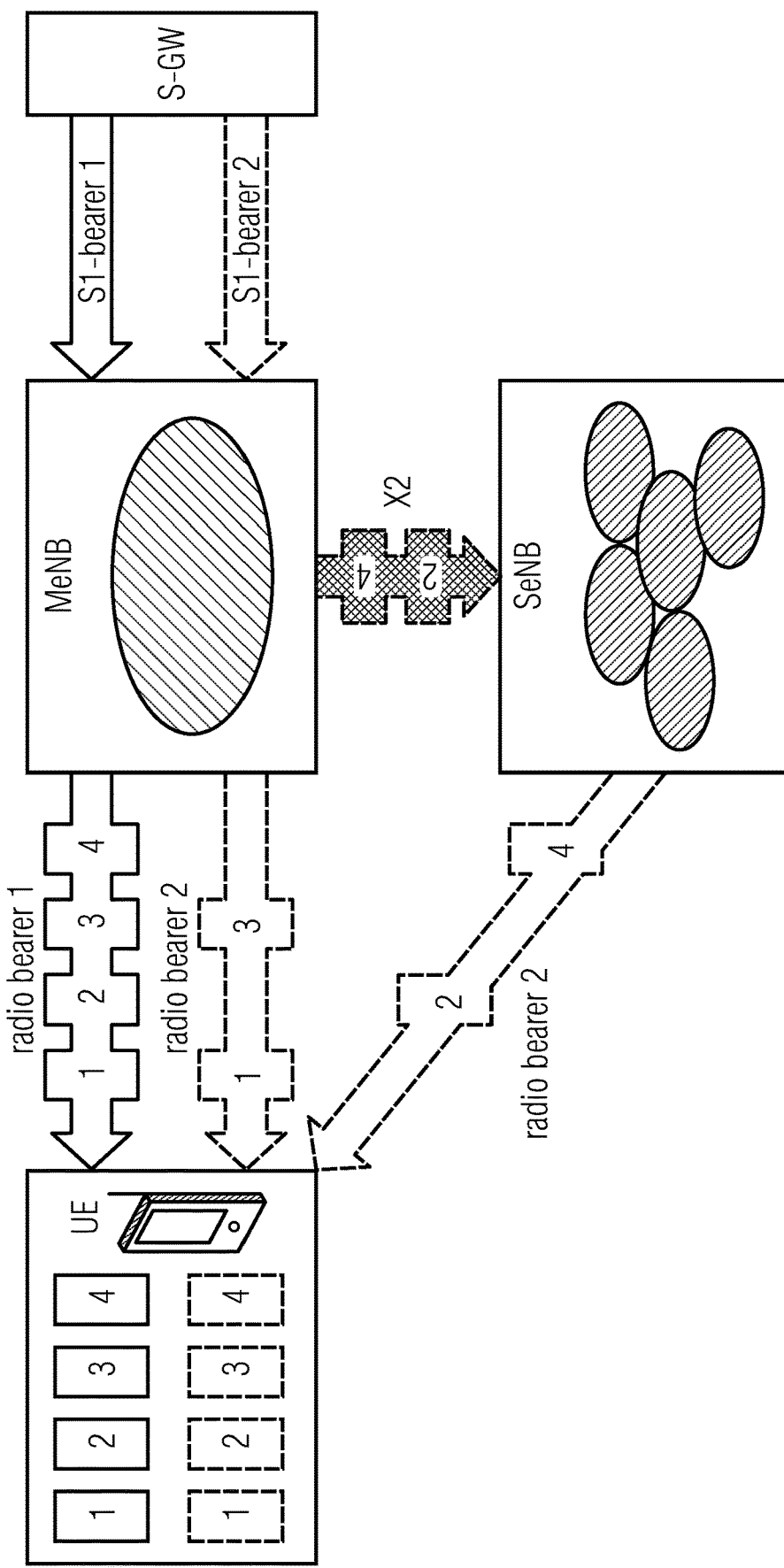
FIG. 17 shows a schematic diagram illustrating a data split at the packet level according to [11]
Figure 18A:
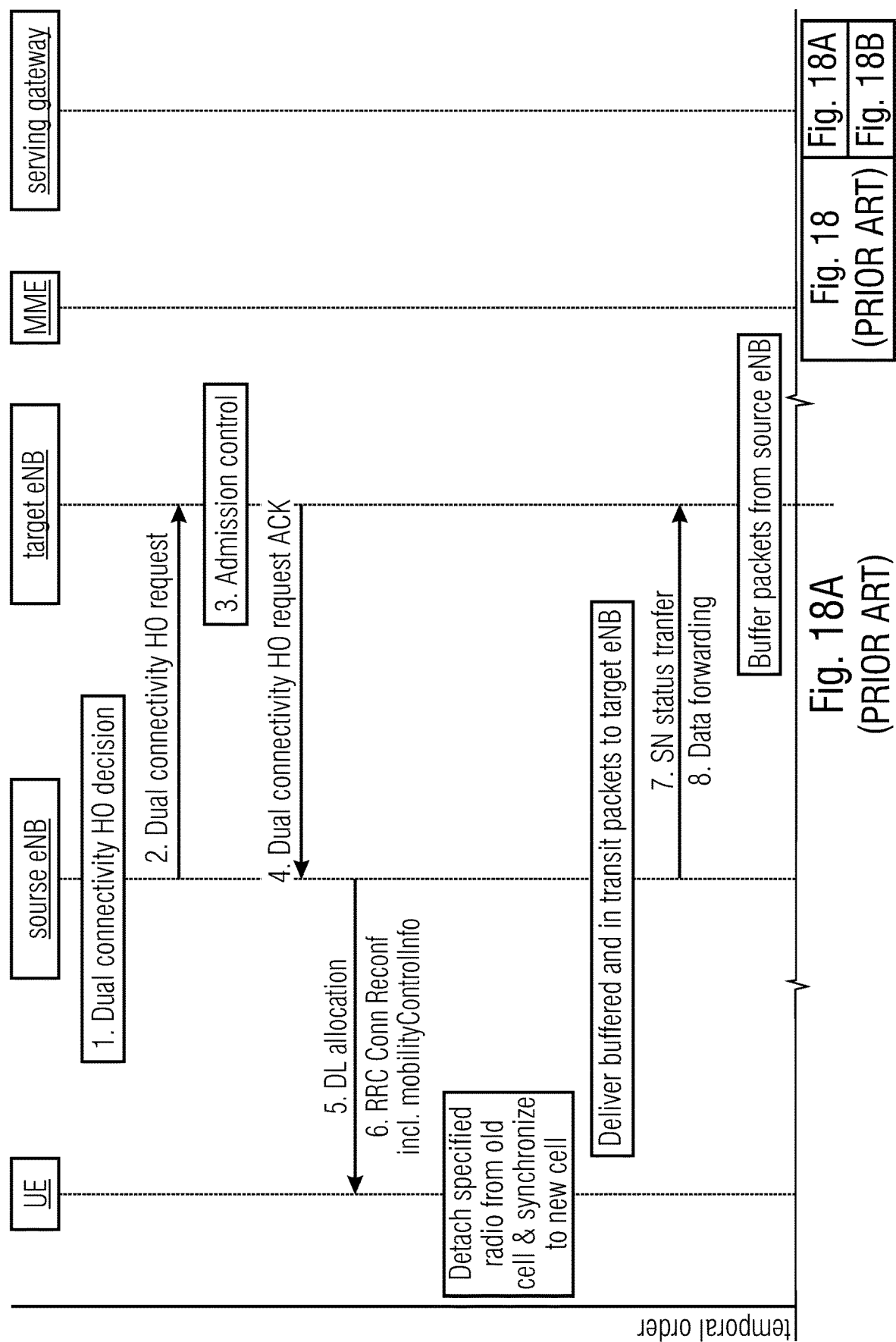
FIG. 18a-b shows a sequence of steps involved in a DC sequence chart according to [12], the sequence of steps being illustrated in a manner similar to the manner the sequence of step is illustrated in FIGS. 2 and 3.
Figures 18, 18B:
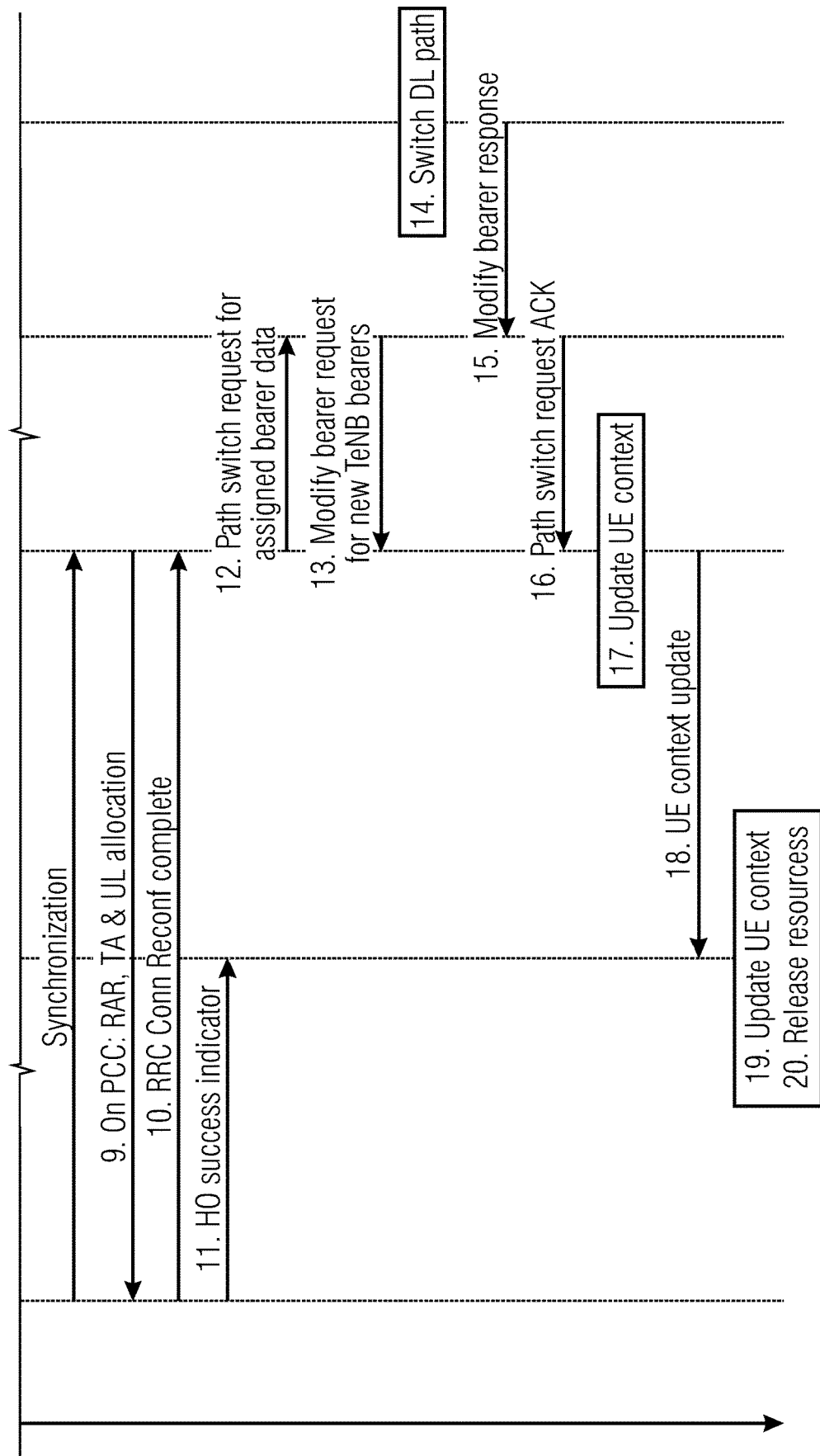

A UE can be connected to a Master eNB and Secondary eNB but can have only one RRC connection with the Master eNB. In a V2X scenario, DC can enhance seamless or zero interruption HO between various eNBs along a predicted route, by ensuring guaranteeing one active/inactive. The data split in the User-plane can take place at the bearer or packet level as shown in FIGS. 16 and 17 [10]

"To initiate the HO, the source eNB sends a HO Request on X2. The HO Request needs to be modified to indicate that this is a dual connectivity HO as opposed to a traditional HO. The goal of the HO is to hand over a subset of the DRBs to the target eNB. Thus, we will need to augment the HO request message to specify which bearers are to be handed over. Currently, the UE context includes information on the bearers that are assigned to the source eNB. For dual connectivity, the UE context will need to specify which of its bearers are mapped to the target eNB.

The target eNB will indicate which bearers it is willing to accept in the HO Request ACK. As in the current HO procedure, bearers that are not accepted will be dropped. The target eNB sends the DL allocation and RRCConn Reconf with mobilityControlInformation to the source who sends it to the UE. SN status transfer and data forwarding will proceed for the bearers that are to be transferred. The UE will start RACH on one of its radios while maintaining regular communication of all bearers that remain on the source eNB.

If the handover is successful, the UE sends RRC Conn Reconf Complete as usual. Upon HOF, a new RRC message is sent to the source eNB on its associated UE radio to indicate the failure. The source eNB can assist the UE by either accepting a connection from radio #2 or by preparing another eNB to do so.

If the HO was successful, the target eNB will send a path switch Request to the MME on S1 requesting its assigned bearers. The MME will send Modify Bearer request to the Gateway. Finally, the target eNB updates its UE Context and sends a UE Context Update to the source eNB over X2. The source eNB updates its UE Context and releases resources associated with the HO." [12]

It should have become clear from the brief introduction put forward above, the concept of managing a tracking/paging area for some user entity reduces the burden on the side of the cellular network to continuously reserve radio resources for user entities for which one or more communication sessions are active, but for which the one or more communication session does not involve a continuous transmission of packets. Thus, it is sufficient if the cellular network keeps track of where the UE is at least approximately; namely, within some tracking/paging area, so that packets addressed to the UE may be forwarded to the one or more base stations within this tracking/paging area, and if the base stations within the tracking/paging area know the context data of the UE. The concept exploited in some of the embodiment described with respect to active UEs and the preemptive preparation of handovers as used in some of the embodiments described above, is now reused in order to more efficiently deal with non-active UEs; namely, in that a schedule of a time-varying tracking/paging area is introduced and/or a tracking/paging area is determined depending on a predicted future route of the user entity.

Figure 19:
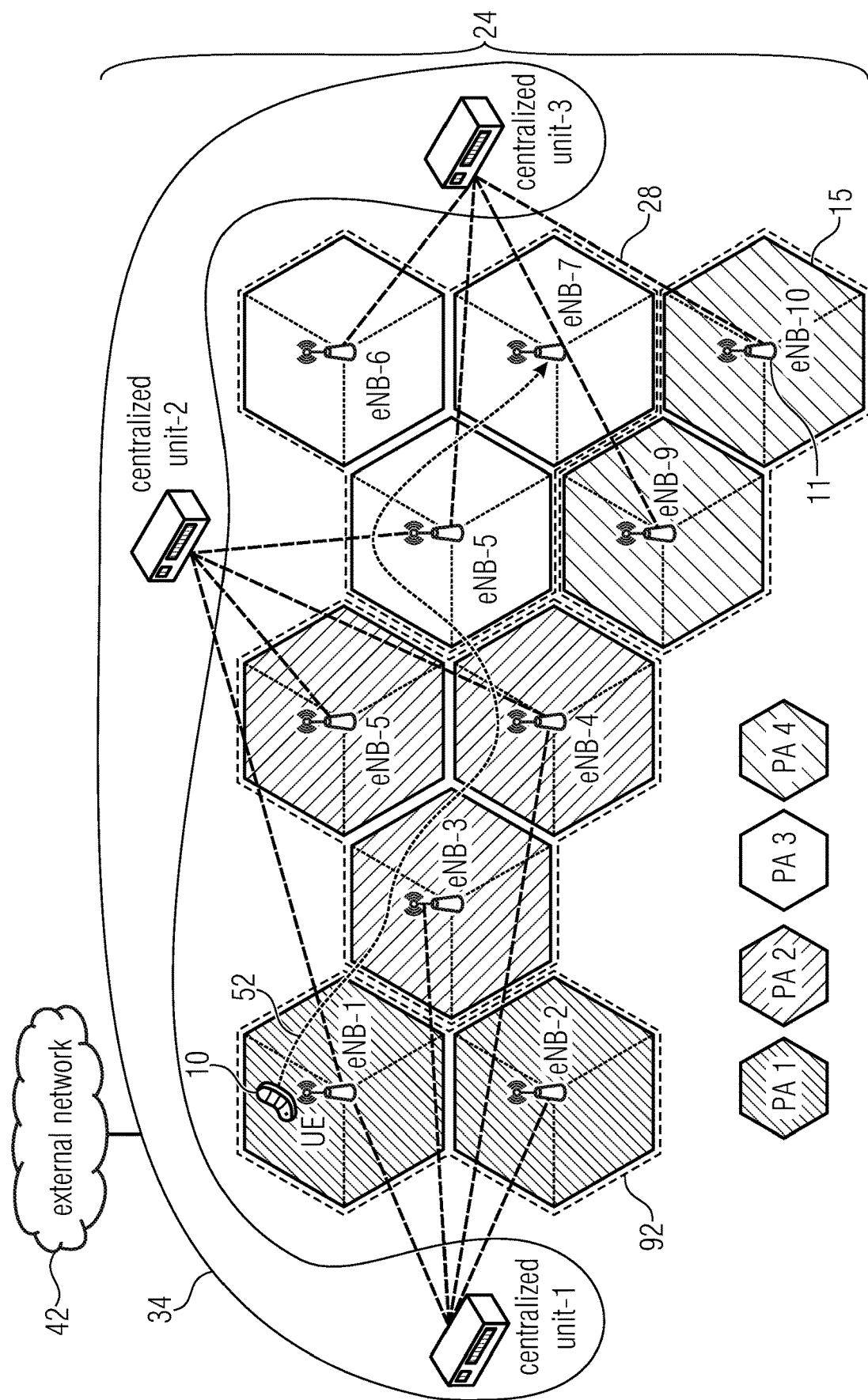
FIG. 19 shows a schematic block diagram of a cellular network, a UE and the involved base stations in accordance with embodiments of the present application where non-active UEs are efficiently handled using intelligent definition of the tracking/paging area.

In order to explain embodiments of the present application with respect to this aspect, reference is made to FIG. 19 which reuses some of the reference signs already used previously; namely, with respect to entities that assume the same or a similar task within the overall communication network.

Figure 20:
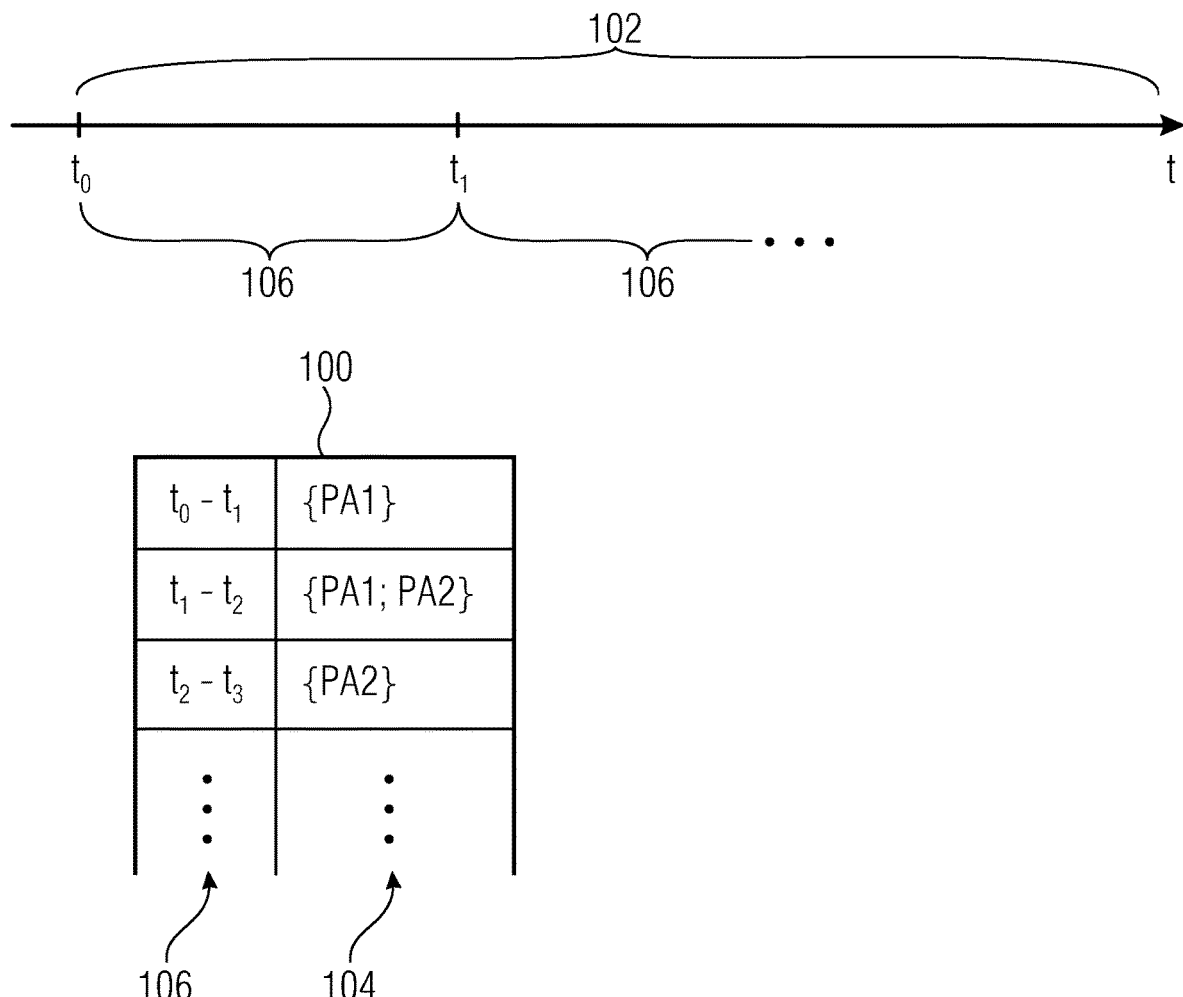
FIG. 20 shows a schematic diagram illustrating the mode of operation of the entities involved in the scenery of FIG. 19 in accordance with an embodiment where a time-varying tracking/paging area is used.

In particular, FIG. 19 shows a cellular network 24 which is, as discussed with respect to FIG. 4, composed of a plurality of base stations 11 spread so as to cover with their associated cells 15 a certain region or geographical area, wherein the base stations 11 serve UEs within their cells in that the same perform the wireless communication with the UEs within their cells. The base stations 11 are connected via some interface 28 with the core network 34 of cellular network 24. This core network 34 in turn, may have an interface towards an external network 42. With respect to activated UEs, i.e., UEs which are currently connect to the cellular network 24 via a current source base station, the behavior of cellular network 24 and the UEs communicating via cellular network 24 of FIG. 19 may be as described with respect to FIG. 4 or, optionally, in accordance with the current solutions discussed above with respect to FIGS. 1 to 3. The cellular network 24 of FIG. 19, however, is configured to establish for a predetermined user entity 10 a schedule of a time-varying tracking/paging area spanned or defined by a time-varying set of one or more base stations or made-up by the cell(s) of the set of one or more base stations. In order to explain this in more detail, reference is made to FIG. 20. FIGS. 19 and 20 assume that the base stations 11 are spatially pre-clustered into so-called "paging areas" 90. Four such clusters or spatially-neighboring base stations 11 are exemplarily shown in FIG. 19. It should be noted, however, that this clustering is not mandatory for the present embodiment. As shown in FIG. 20, the cellular network 24 determines, at some time instant $t_0$, for a UE 10, a time-varying tracking/paging area. The time instant $t_0$ might, for instance, be initiated by UE 10 which decides to switch from an active mode to an intermediate mode of low activity, the details of which are described and exemplified in more detail below. The tracking/paging area is, at each time instant, an area served or spanned by a set of one or more base stations, but this set varies in time. Its determination occurs at time instant $t_0$ based on some sort of prediction similar to thoughts which led to set 50 in FIG. 5. For instance, the tracking/paging area may be defined to follow a predicted future route 52 of UE 10, i.e., to follow the position the UE 10 has predicted to assume in route 52. The outcome of such determination is shown in FIG. 20 as a schedule 100. In particular, schedule 100 defines, for each time instant within some time interval 102 which follows time instant $t_0$, the set of one or more base stations 11 which form the tracking/paging area, i.e., set 104. In FIG. 20 it is exemplified that schedule 100 indicates the set 104 in units of clusters 92, but this might be solved differently. In particular, schedule 100 indicates this set for consecutive partial intervals 106, into which the time interval 102 is sub-divided. That is, for each such partial interval 106, schedule 100 indicates the set 104 of base stations 11 which make up the tracking/paging area. Alternatively, the UE 10 is intermittently informed on the time-varying tracking/paging area by way of messages intermittently updating the set of base station cells defining the area 104.

The cellular network 24 then sends the schedule 100 or messages intermittently updating area 104 to the user entity 10 which, thus, is able to continuously check whether the UE 10 leaves this time-varying tracking/paging area defined by the time-varying set of one or more base stations 104 or not. As long as the UE does not leave the time-varying tracking/paging area, the UE is within an area within which the cellular network 24 expects the UE 10 to be. As long as the UE 10 does not wish to initiate an uplink communication and to switch to active mode, the UE 10 needs to do nothing. The cellular network 24, in turn, takes the appropriate measures to fulfill tasks which seek to reflect the fact that the tracking/paging area is changing over time as scheduled in schedule 100. In particular, the cellular network 24 provides each base station of set 104, i.e., each base station currently within the set 104 of base stations which define the tracking/paging area, with context data of UE 10 so that these base stations are aware, for instance, of the UE's 10 subscriber data currently active one or more communication sessions, one or more IDs used by the cellular network 24 to identify UE 10 and distinguish UE 10 from other UEs and/or other UE specific data. Further, cellular network 24, itself, uses schedule 100 so as to search for UE 10 whenever an inbound or downlink packet of one of one of more active communications sessions arrives at the core network 34 addressed to UE 10. In particular, the cellular network 24 then looks up in schedule 100 which set 104 of base stations currently makes up or defines the tracking/paging area and informs via these one or more base stations that the UE 10 should connect to the cellular network 24 so as to be able to receive this packet. The control signaling overhead is kept low as the UE is within the time-varying tracking/paging area and the base station within the cell 15 of which the UE 10 currently is, belongs to the set 104 defining this tracking/paging area and this base station already has at hand the context data of UE 10.

Figure 21:
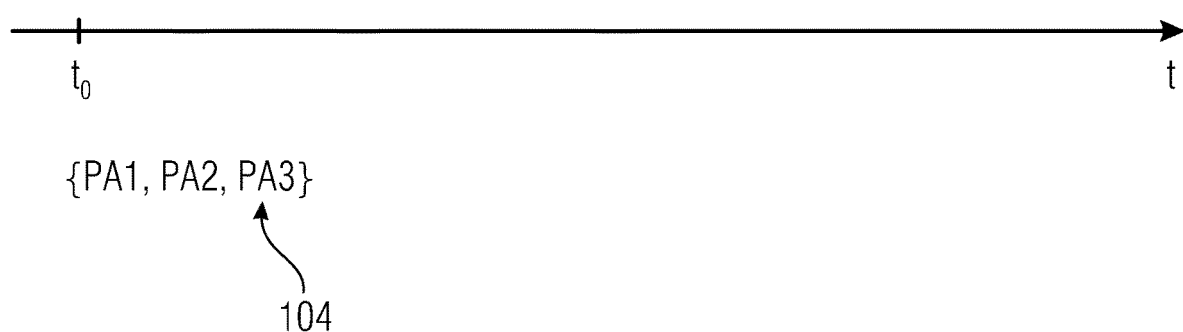
FIG. 21 shows a schematic diagram illustrating the mode of operation of the entities involved in the scenery shown in FIG. 19 in accordance with an embodiment where the tracking/paging area is defined depending on a predicted future route of the UE.

It should be noted that, according to an alternative embodiment, the cellular network of FIG. 19 does not form a schedule 100 of a time-varying tracking/paging area. Rather, as depicted in FIG. 21, according to this alternative, the cellular network 24 uses the gained knowledge about the predicted future route 52 so as to appropriately select the set 104 of one or more base stations which define the tracking/ paging area. As long as the UE is within this area 104 which has precisely been predicted using predicted future route 52, control signaling overhead on the side of the UE which could negatively impact the power consumption of UE 10, may be avoided. In the example of FIG. 21, cellular network 24 sends to the UE 10 the set 104. In both alternatives discussed above with respect to FIGS. 20 and 21, the user entity 10 is a user entity for communication over cellular network 24 and the user entity 10 is configured to continuously check whether it is still in the tracking/paging area defined by the set 100 of one or more base stations or whether the user entity has left the same. In case of leaving, the user entity 10 sends a tracking/paging area update message to the cellular network 24 which, in turn, then re-initiates the determination of the tracking/paging area according to FIG. 20 or FIG. 21, respectively. In case of receiving schedule 100, user entity 10 is able to check this schedule 100.

Thus, the above examples of FIGS. 19 to 21 reveal that it is possible to realize and autonomous UE handover decision in RRC inactive state for NR (in LTE called lightly connected) assuming the new context already exists in the new node (already received in the new node because of the predictive context forwarding). In other words, these embodiments enable a lightly connected mode of the UE with efficient paging using prediction information.

Efficient Paging using prediction information in Lightly Connected Mode as shown in FIG. 19 entails the update of the centralized unit information and the Tracking Area Identifier (TAI) List of the various RAN paging/notification areas using the predicted route information of the UE when in RRC lightly connected mode (RRC Idle mode not precluded). The UE traditionally receives a TAI list when initially attaching to a source eNB in the LTE network. When the UE travels in a Tracking Area not contained in the TAI list, the UE sends a Tracking Area Update (TAU) informing the MME (core network) about its position. In order to enable to efficient paging using predicted route information, another solution is proposed whereby the UE does not require the transmission of updates to the anchor eNB or centralized unit when the UE changes RAN paging/notification areas:

1. The source/anchor eNB or centralized unit provides a near complete predicted RAN paging/notification area list (pPAI) list to the UE upon connection establishment, corresponding with the predicted route of the UE, avoiding the need to page multiple cells of the same paging area (See FIG. 19) to locate the UE, thus reducing paging overhead. According to FIG. 19, the UE would receive a pPAI={PA1, PA2,PA3} corresponding to the predicted route.

2. To further increase paging efficiency in terms of finer granularity, another list containing the Target eNB IDs could also be provided. For example the target eNB list could contain, TeNBI={eNB-1, eNB-3, eNB-4, eNB-5, eNB-7} as seen in FIG. 19. When a DL message is waiting to be received in lightly connected mode, the anchor eNB or centralized unit need not page the PAs but rather the individual eNBs in the TeNBI list.

3. In the event, that the UE route abruptly changes the route and moves to a PA not on the pPAI, e.g. PA4 in FIG. 19, the UE notifies the anchor eNB or centralized unit using a paging area/RAN notification area update (PAU/RNAU). An example of additional predicted paging message parameters is shown in Table 1:

TABLE 1

Example messages for predictive paging

| IE/Group Name | Description |
| --- | --- |
| UE-Paging-Area-ID | "This IE represents the Identity with which the UE is paged." [12] |
| pPAI-List | TA list corresponding to predicted route |
| TeNBI-List-ID | Identifiers of Target eNBs along predicted route |

Thus, the above-described embodiment, inter alias, enabled a preemptive UE signaling based on predictive UE route information to perform a faster HO. Again, it is noted that this might be used also in UEs which are in a dual-connectivity mode. High reliability HO by using RRC diversity using route prediction and dual-connectivity mode is feasible. All the above embodiments can be applied to wireless communication systems, e.g., cellular, wireless or meshed wireless networks as well as wireless ad-hoc networks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

List of Acronyms and Symbols

In addition, reference is made to 3GPP TR 21.905: "Vocabulary for 3GPP Specifications".
eNB Evolved Node B (3G or 4G base station)
gNB NR node=next Generation NB (5G base station)
LTE Long-Term Evolution
NR New Radio
UE User Equipment (User Terminal)
HO Handover
P-HO Predicted Handover
RRC Radio Resource Control
MME Mobile Management Entity
V2V Vehicle-to-Vehicle
V2X Vehicle-to-infrastructure
SeNB Secondary eNB
MeNB Master eNB

REFERENCES

[1] S. Sesia, I. Toufik, and M. Baker, LTE The UMTS Long Term Evolution: From Theory to Practice, 2nd ed. Wiley, 2011
[2] Alcatel Lucent, The LTE Network Architecture: A comprehensive Tutorial, White Paper, pp. 1-26, 2009
[3] Qualcomm, Design details for light connection model A, TDoc R2-168345
[4] LTE; Evolved Universal Terrestrial Radio Access Network (E-UTRAN); S1 Application Protocol (S1AP), TS 136 413 V12.3.0 (2014 September), pp. 114
[5] E. Dahlman, S. Parkvall, J. Sköld, "4G, LTE-Advanced Pro and The Road to 5G", Elsevier, $3^{rd}$ Edition, 2016
[6] LTE; Evolved Universal Terrestrial Radio Access Network (E-UTRAN); Overall Description, Stage 2, Release 14, TS 36 300 V14.1.0 (2016 December), pp. 96
[7] 3GPP, "Study on New Radio Access Technology; Radio Access Architecture and Interfaces (Release 14)", Tech. Rep, TR 36.801 v1.0.0, December 2016.
[8] Technical Specification Group Services and System Aspects; Architecture enhancements for V2X services (Release 14), TS 23.285, V14.1.0, (2016 December)
[9] Intelligent Transport Systems (ITS); Framework for Public Mobile Networks in Cooperative ITS (C-ITS); ETSI TR 102 962 V1.1.1 (2012 February), pp. 37
[10] Zhang et al., LTE Small Cell Enhancement by Dual Connectivity, Wireless World Research Forum, White Paper, November 2014.
[11] Broadcom Corporation, "Mobility for dual connectivity", T-DOC, R2-130990, 2013.
[12] Frédéric Firmin, NAS, 3GPP, http://www.3gpp.org/technologies/keywords-acronyms/96-nas, Last Accessed 27 Jan. 2017.
[13] Developing Solutions, About the S1 Dictionary, http://www.developingsolutions.com/S1Dict/Topics/About.htm, Last Accessed 27 Jan. 2017.
[14] Intelligent Transport Systems (ITS); Vehicular Communications; Basic Set of Applications; Part 2: Specification of Cooperative Awareness Basic Service, ETSI TS 102 637-2 V1.2.1, March 2011.
[15] Intelligent Transport Systems (ITS); Vehicular Communications; Basic Set of Applications; Part 3: Specifications of Decentralized Environmental Notification Basic Service, Final draft ETSI EN 302 637-3 V1.2.1, September 2014.

The invention claimed is:
1. A cellular network supporting a preemptive preparation of a handover for a user entity,
wherein the cellular network comprises a microprocessor configured for, or an electronic circuit configured for, or a computer programmed with a program stored in a memory configured for
receiving from the user entity predicted future route information including
a set of pairs of time and coordinates of location at which the user entity is along a predicted future route, or
a sequence of coordinates of locations sequentially traversed by the user entity along the predicted future route, determining, based on the predicted future route information, a preliminary set of one or more base stations of the cellular network, wherein the cardinality of the set of one or more base stations is greater than one;

sending a query from a centralized unit of the cellular network to each of the preliminary set of one or more base stations of the cellular network regarding an accessibility of the cellular network via the respective base station at an expected time at which the user entity enters a cell of the respective base station, and sending an answer from the respective base station to the centralized unit.

2. The cellular network according to claim 1, configured for:

establishing, for each base station x of the set of one or more base stations of the cellular network,
a temporal access interval starting at start time $t^x_{start}$ and
one or more access parameters, so that the user entity may access the cellular network via the respective base station during the temporal access interval using the one or more access parameters; and sending to the user entity a schedule indicating the start time $t^x_{start}$ and the one or more access parameters for each base station x of the set of one or more base stations.

3. The cellular network according to claim 1, configured for establishing, for each base station x of the set of one or more base stations of the cellular network,
a temporal access interval starting at start time $t^x_{start}$ and ending at a temporal end and
one or more access parameters, so that the user entity may access the cellular network via the respective base station during the temporal access interval using the one or more access parameters; and sending to the user entity a schedule indicating the start time $t^x_{start}$ and the one or more access parameters and as to when the temporal access interval ends for each base station x of the set of one or more base stations.

4. The cellular network according to claim 1, wherein the cellular network is configured to determine the set of one or more base stations of the cellular network based on the predicted future route information such that the set of one or more base stations are positioned alongside the predicted future route.

5. The cellular network according to claim 1, wherein the query comprises information on one or more current identifiers with which the user entity is identified in the cellular network.

6. The cellular network according to claim 2, configured so that each of the set of one or more base stations reserves radio access resources defined by the one or more access parameters for the respective base station during the temporal access interval for the respective base station.

7. The cellular network according to claim 2, configured to perform the preemptive preparation of the handover by further scheduling, for each of the set of one or more base stations of the cellular network, a redirection of packets of one or communications running over the cellular network and the user entity so that the packets are distributed to each of the set of one or more base stations of the cellular network depending on the temporal access interval for the respective base station.

8. The cellular network according to claim 2, wherein the cellular network is configured to establish, at least for one of the set of one or more base stations, the temporal access interval such that the temporal access interval comprises a future start.

9. The cellular network according to claim 2, configured to provide the user entity with a schedule indicating, at least for each of a subset of the set of one or more base stations,
the temporal access interval and
the one or more access parameters.

10. The cellular network according to claim 2, configured to, triggered by an access of the cellular network by the user entity via one of the set of one or more base stations, to redirect a cellular network internal subpath of each of a set of current communication paths running via the cellular network and the user entity, from a base station via which the user entity is currently connected to the cellular network, to the one of the set of base stations.

11. The cellular network according to claim 2, configured to, triggered by an access of the cellular network by the user entity via one of the set of one or more base stations, to further release resources at a base station via which the user entity previously connected to the cellular network.

12. The cellular network according to claim 1, configured to resume connectivity to the user entity after loss of the connectivity to the user entity via the preemptively prepared handover.

13. A user entity for communication over a cellular network, wherein the user entity comprises a microprocessor configured for, or an electronic circuit configured for, or a computer programmed with a program stored in a memory configured for gaining information on a predicted future route of the user entity; and informing the cellular network on the predicted future route by sending to the cellular network
a set of pairs of time and coordinates of location at which the user entity is along the predicted future route, or
a sequence of coordinates of locations sequentially traversed by the user entity along the predicted future route;

managing a set of one or more preemptively prepared handovers by
deriving, for each of a set of one or more base stations of the cellular network, one or more access parameters, and
continuously deciding on, or judging whether, accessing the cellular network via any of a set of one or more base stations within a reach of which the user entity currently is, using the one or more access parameters derived for the respective base station,
wherein the cardinality of the set of one or more base stations is greater than one.

14. The user entity according to claim 13, wherein the user entity is configured to manage a set of one or more preemptively prepared handovers.

15. The user entity according to claim 14, configured to receive a schedule scheduling the set of one or more preemptively prepared handovers from the cellular network.

16. The user entity according to claim 15, wherein the user entity is configured to continuously check, subsequent to the reception of the schedule from the cellular network, whether the schedule becomes inadequate, and inform the cellular network on the inadequateness.

17. The user entity according to claim 14, configured to derive from the schedule, for each of a set of one or more base stations of the cellular network, a temporal access interval and one or more access parameters.

18. The user entity according to claim 14, configured to derive from the schedule, for each of a set of one or more base stations of the cellular network, a start time of a temporal access interval and one or more access parameters.

19. The user entity according to claim 14, configured to perform the continuous deciding or judgment without acquiring current permission from the cellular network.

20. The user entity according to claim 14, configured to perform the managing of the set of one or more preemptively prepared handovers with respect to one or more wireless connections to the cellular network of a set of current wireless connections to the cellular network.

21. The user entity according to claim 14, configured to resume connectivity to the cellular network after loss of the connectivity using any of the set of one or more preemptively prepared handovers despite a temporary loss of connection.

22. A base station of a cellular network, wherein the base station comprises a microprocessor configured for, or an electronic circuit configured for, or a computer programmed with a program stored in a memory configured for
receiving from a user entity predicted future route information including
a set of pairs of time and coordinates of location at which the user entity is along a predicted future route, or
a sequence of coordinates of locations sequentially traversed by the user entity along the predicted future route;
determining a preliminary set of one or more target base stations of the cellular network based on the predicted future route information, wherein the cardinality of the preliminary set of one or more base stations is greater than one;
querying each of the preliminary set of one or more target base stations regarding an accessibility of the cellular network via the respective target base station;
receiving, from each of the preliminary set of one or more base stations, an answer to the query;
sending to the user entity a schedule indicating, for each of a set of one or more base stations within the preliminary set, a temporal access interval and one or more access parameters indicating that the user entity may access the cellular network via the respective base station during the temporal access interval using the one or more access parameters, and
cutting, upon receipt of an access confirmation from any of the set of one or more base stations, a connection to the user entity.

23. The base station according to claim 22, configured to determine the preliminary set of one or more base stations of the cellular network based on the predicted future route information such that the set of one or more base stations are positioned alongside the predicted future route.

24. The base station according to claim 22, configured so that the query comprises information on
one or more current identifiers using which the user entity is identified in the cellular network.

25. The base station according to claim 22, configured to query each of the preliminary set of one or more base stations of the cellular network regarding an accessibility of the cellular network via the respective base station at an expected time at which the user entity enters the respective cell according to the predicted future route.

26. The base station according to claim 22, wherein the cardinality of the set of one or more base stations is greater than one.

27. The base station according to claim 22, configured such that, at least for one of the set of one or more base stations, the temporal access interval comprises a future start.

28. The base station according to claim 22, configured to allow a resuming of connectivity to the user entity after loss of the connectivity using the temporal access interval and the one or more access parameters for any of the set of one or more base stations.

29. The base station according to claim 22, configured to indicate in the schedule a start time $t^x_{start}$ of the temporal access interval and the one or more access parameters for each base station x of the set of one or more base stations.

30. The base station according to claim 22, configured to indicate in the schedule a start time $t^x_{start}$ of the temporal access interval, the one or more access parameters and as to when the temporal access interval ends for each base station x of the set of one or more base stations.

31. A method for operating a cellular network comprising preemptively preparing a handover for a user entity,
wherein the method performed on a microprocessor or electronic circuit comprises
receiving from the user entity predicted future route information including
a set of pairs of time and coordinates of location at which the user entity is along a predicted future route, or
a sequence of coordinates of locations sequentially traversed by the user entity along the predicted future route;
determining, based on the predicted future route information, a preliminary set of one or more base stations of the cellular network, wherein the cardinality of the set of one or more base stations is greater than one;
sending a query from a centralized unit of the cellular network to each of the preliminary set of one or more base stations of the cellular network regarding an accessibility of the cellular network via the respective base station at an expected time at which the user entity enters a cell of the respective base station; and
sending an answer from the respective base station to the centralized unit.

32. A method for communication from a user entity over a cellular network, comprising
gaining information on a predicted future route of the user entity; and
informing the cellular network on the predicted future route
by sending to the cellular network
a set of pairs of time and coordinates of location at which the user entity is along the predicted future route, or
a sequence of coordinates of locations sequentially traversed by the user entity along the predicted future route,
managing a set of one or more preemptively prepared handovers by
deriving for each of a set of one or more base stations of the cellular network, one or more access parameters, and
continuously deciding on, or judging whether, accessing the cellular network via any of a set of one or more base stations within a reach of which the user entity currently is, using the one or more access parameters derived for the respective base station,
wherein the cardinality of the set of one or more base stations is greater than one.

33. The method of claim 32, further comprising managing a set of one or more preemptively prepared handovers.

34. A method of operating a base station of a cellular network, comprising
- receiving from a user entity predicted future route information including
  - a set of pairs of time and coordinates of location at which the user entity is along a predicted future route, or
  - a sequence of coordinates of locations sequentially traversed by the user entity along the predicted future route;
- determining a preliminary set of one or more target base stations of the cellular network based on the predicted future route information, wherein the cardinality of the preliminary set of one or more base stations is greater than one; and
- triggered by the user entity entering a predetermined area, querying each of the preliminary set of one or more target base stations regarding an accessibility of the cellular network via the respective target base station;
- receiving, from each of the preliminary set of one or more base stations, an answer to the query;
- sending to the user entity a schedule indicating, for each of a set of one or more base stations within the preliminary set, a temporal access interval and one or more access parameters indicating that the user entity may access the cellular network via the respective base station during the temporal access interval using the one or more access parameters; and
- cutting, upon receipt of an access confirmation from any of the set of one or more base stations, a connection to the user entity.

* * * * *